(12) United States Patent
Blevins et al.

(10) Patent No.: US 9,436,174 B2
(45) Date of Patent: Sep. 6, 2016

(54) KALMAN FILTERS IN PROCESS CONTROL SYSTEMS

(71) Applicant: FISHER-ROSEMOUNT SYSTEMS, INC., Round Rock, TX (US)

(72) Inventors: Terrence L. Blevins, Round Rock, TX (US); Mark J. Nixon, Round Rock, TX (US); Wilhelm K. Wojsznis, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 607 days.

(21) Appl. No.: 13/963,307

(22) Filed: Aug. 9, 2013

(65) Prior Publication Data

US 2014/0249654 A1    Sep. 4, 2014

Related U.S. Application Data

(63) Continuation-in-part of application No. 13/782,478, filed on Mar. 1, 2013.

(51) Int. Cl.
*G05B 19/048* (2006.01)
*G05B 19/05* (2006.01)
*G05B 13/04* (2006.01)

(52) U.S. Cl.
CPC ........... *G05B 19/058* (2013.01); *G05B 13/048* (2013.01); *G05B 2219/41146* (2013.01); *G05B 2219/41367* (2013.01)

(58) Field of Classification Search
CPC .......... G05B 2219/24075; G05B 2219/41367; G05B 2219/41146
See application file for complete search history.

(56) References Cited

U.S. PATENT DOCUMENTS

| | | | |
|---|---|---|---|
| 4,861,960 A | 8/1989 | Haefner et al. | |
| 5,444,612 A * | 8/1995 | Torii | B25J 9/1638 318/561 |

(Continued)

FOREIGN PATENT DOCUMENTS

| | | |
|---|---|---|
| EP | 1 321 836 A1 | 6/2003 |
| WO | WO-2007/067645 A2 | 6/2007 |

OTHER PUBLICATIONS

Search Report for Application No. GB1402080.4, dated Jul. 31, 2014.

(Continued)

*Primary Examiner* — Ryan Jarrett
(74) *Attorney, Agent, or Firm* — Marshall, Gerstein & Borun LLP

(57) ABSTRACT

A control technique that enables the use of received process variable values in a Kalman filter based control scheme without the need to change the control algorithm includes a controller, such as a PID controller, and a Kalman filter, coupled to receive feedback in the form of, for example, process variable measurement signals from a process. The Kalman filter is configured to produce an estimate of the process variable value from slow or intermittent process feedback signals while providing a new process variable estimate to the controller during each of the controller execution cycles to enable the controller to produce a control signal used to control the process. The Kalman filter is also configured to compensate the process variable estimate for process noise with non-zero mean value that may be present in the process. The Kalman filter may apply this compensation to both continuously and intermittently received process variable values.

16 Claims, 7 Drawing Sheets

(56) References Cited

U.S. PATENT DOCUMENTS

| | | | |
|---|---|---|---|
| 5,905,351 A * | 5/1999 | Morishita | G05B 19/19 318/560 |
| 7,519,012 B2 | 4/2009 | Tapperson et al. | |
| 7,587,252 B2 | 9/2009 | Blevins et al. | |
| 7,620,460 B2 | 11/2009 | Blevins et al. | |
| 7,945,339 B2 | 5/2011 | Blevins et al. | |
| 2004/0054440 A1 | 3/2004 | Zhang et al. | |
| 2007/0093918 A1* | 4/2007 | Blevins | G05B 11/42 700/20 |
| 2008/0082180 A1 | 4/2008 | Blevins et al. | |

OTHER PUBLICATIONS

Search Report for Application No. GB1402081.2, dated Jul. 30, 2014.

"The Scalar Kalman Filter," An Introduction to Scalar Kalman Filters (2012). Retrieved from the Internet on Feb. 28, 2013: URL:http://www.swarthmore.edu/NatSci/echeeve1/Ref/Kalman/ScalarKalman.html.

Censi., "Kalman Filtering with Intermittent Observations: Convergence for Semi-Markov Chains and an Intrinsic Performance Measure", IEEE Transactions on Automatic Control (2004).

Cortes et al., "Coverage control for mobile sensing networks" Conditionally Accepted, Regular Paper, IEEE Transactions on Robotics and Automation (2002).

Jadbabaie et al., "Coordination of groups of mobile autonomous agents using nearest neighbor rules" IEEE Transactions on Automatic Control (2003).

Kawadia et al., "A Cautionary Perspective on Cross-Layer Design" IEEE Wireless Commun., 12(1):3-11 (2005).

Lian et al., "Network design consideration for distributed control systems" IEEE Transactions on Control Systems Technology, 10(2):297-307 (2002).

Liu et al., "Cross-layer Design of Distributed Control over Wireless Networks", Systems & Control: Foundations & Applications, (Ed. T. Basar), Birkhauser (2005).

Liu et al., "Kalman filtering with partial observation losses", IEEE conference on decision and control, pp. 4180-4186 (2004).

Montestruque et al. "On the Model-Based Control of Networked Systems", Automatics, 39:1837-1843 (2003).

Olfati-Saber et al., "Consensus Problems in Networks of Agents with Switching Topology and Time-Delays" IEEE Transactions on Automatic Control, 49(9):1520-1533 (2004).

Tatikonda et al., "Stochastic linear control over a communication channel", IEEE Transactions on Automatic Control, 49(9):1549-1561 (2004).

Tatikondaet al., "Control Under Communication Constraints", IEEE Transactions on Automatic Control, 49(7):1056-1068 (2004).

Wong et al., "Systems with Finite Communication Bandwidth Constraints—Part I: State Estimation Problems", IEEE Transactions on Automatic Control, 42(9):1294-1299 (1997).

Wong et al., "Systems with Finite Communication Bandwidth Constraints—Part II: Stabilization with Limited Information Feedback", IEEE Transactions on Automatic Control, 44(5):1049-1053 (1997).

* cited by examiner

KALMAN FILTERS IN PROCESS CONTROL SYSTEMS

CROSS REFERENCE TO RELATED APPLICATIONS

This application is related to U.S. application Ser. No. 13/782,478, entitled "Use of Predictors in Process Control Systems with Wireless or Intermittent Process Measurements" and filed on Mar. 1, 2013, the entire disclosure of which is hereby expressly incorporated by reference herein.

TECHNICAL FIELD

The present disclosure relates generally to process monitoring and control systems and, more particularly, to the transmission and processing of continuous, wireless and/or intermittent control communications in process control systems having controllers that use Kalman filters.

BACKGROUND

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals which are sent over the buses to the field devices to control the operation of the process. Information from the field devices and the controller is typically made available to one or more applications executed by the operator workstation to enable an operator to perform any desired function regarding the process, such as viewing the current state of the process, modifying the operation of the process, etc.

Some process control systems, such as the DeltaV™ system sold by Emerson Process Management, use function blocks or groups of function blocks referred to as modules located in the controller or in different field devices to perform control and/or monitoring operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, monitoring a device, controlling a device, or performing a control operation, such as the implementation of a proportional-integral-derivative (PID) control routine. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and an output block, such as an analog output (AO) function block. Control routines, and the function blocks that implement such routines, have been configured in accordance with a number of control techniques, including PID control, fuzzy logic control, and model-based techniques such as a Smith predictor or Model Predictive Control (MPC).

To support the execution of the routines, a typical industrial or process plant has a centralized controller or room communicatively connected with one or more process controllers and process I/O subsystems, which, in turn, are connected to one or more field devices. Traditionally, analog field devices have been connected to the controller by two-wire or four-wire current loops for both signal transmission and the supply of power. An analog field device that transmits a signal to the control room (e.g., a sensor or transmitter) modulates the current running through the current loop, such that the current is proportional to the sensed process variable. On the other hand, analog field devices that perform an action under control of the control room is controlled by the magnitude of the current through the loop.

More recently, field devices have been designed operate to superimpose digital data on the current loop used to transmit the analog signals. For example, the Highway Addressable Remote Transducer (HART) protocol uses the loop current magnitude to send and receive analog signals, but also superimposes a digital carrier signal on the current loop signal to enable two-way field communication with smart field instruments. Another protocol generally referred to as the FOUNDATION® Fieldbus protocol is an all digital protocol, that actually defines two sub-protocols, one supporting data transfers at a rate up to 31.25 kilobits per second while powering field devices coupled to the network, and the other supporting data transfers at a rate up to 2.5 megabits per second without providing any power to field devices. With these types of communication protocols, smart field devices, which may be all digital in nature, support a number of maintenance modes and enhanced functions not provided by older control systems.

With the increased amount of data transfer, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the network is subjected to adverse environmental factors or harsh conditions. These factors and conditions can compromise the integrity of communications between one or more field devices, controllers, etc. The communications between the controllers and the field devices are especially sensitive to any such disruptions, inasmuch as the monitoring applications or control routines typically require periodic updates of the process variables for each iteration of the control routine or loop. Compromised control communications could therefore result in reduced process control system efficiency and/or profitability, and excessive wear or damage to equipment, as well as any number of potentially harmful failures.

In the interest of assuring robust communications, I/O communication networks used in process control systems have historically been hardwired. Unfortunately, hardwired networks introduce a number of complexities, challenges and limitations. For example, the quality of hardwired networks may degrade over time. Moreover, hardwired I/O communication networks are typically expensive to install, particularly in cases where the I/O communication network is associated with a large industrial plant or facility distributed over a large area, for example, an oil refinery or a chemical plant consuming several acres of land. The requisite long wiring runs typically involve substantial amounts of labor, material and expense, and may introduce signal degradation arising from wiring impedances and electromagnetic interference. For these and other reasons, hardwired I/O communication networks are generally difficult to reconfigure, modify or update.

More recently, wireless I/O communication networks have been introduced into the process control environment to alleviate some of the difficulties associated with hardwired I/O networks. For example, U.S. Pat. No. 7,519,012, entitled "Distributed Control System for Controlling Material Flow Having Wireless Transceiver Connected to Industrial Process Control Field Device to Provide Redundant Wireless Access," the entire disclosure of which is hereby expressly incorporated by reference herein, discloses a system utilizing wireless communications between controllers and field devices to, for example, augment or supplement the use of hardwired communications. The use of wireless communications between devices within a process control network, such as between controllers and field devices, has quickly gained momentum. In response to this trend, various wireless communication protocols have been established to support wireless communications within process plant environments, including the WirelessHART® protocol.

Complete reliance on wireless communications for control-related transmissions has been limited however due to, among other things, reliability concerns. As described above, modern process control monitoring and control applications assume reliable data communications between the controller and the field devices to achieve optimum control levels. Moreover, typical process controllers execute control algorithms at fast rates to quickly correct unwanted deviations in the process and these control algorithms rely on the availability of new process measurement data during each controller execution cycle. Undesirable environmental factors or other adverse conditions may create intermittent interferences that impede or prevent the fast communications necessary to support such execution of monitoring and control algorithms.

Moreover, power consumption is sometimes a complicating factor for the implementation of wireless communications in process control environments. When disconnected from the hardwired I/O network, the field devices may need to provide their own power source. Accordingly, wireless field devices are typically battery powered, draw solar power, or pilfer ambient energy such as vibration, heat, pressure, etc. For these types of devices, however, the energy consumed when performing data transmission via a wireless network may constitute a significant portion of total energy consumption. In fact, more power may be consumed during the effort to establish and maintain a wireless communication connection than during other important operations performed by the field device, such sensing or detecting the process variable being measured.

Thus, the relatively recent introduction of wireless transmitters in the process control industry has presented many challenges when a wirelessly transmitted measurement is to be used in closed loop control, because the process variable measurements provided in such systems are often reported on a much slower basis (e.g. 15 second update rate) than is typically provided by a wired transmitter. Also, the measurement value provided by a wireless device may be communicated on a non-periodic basis. For example, windowed communications supported by some WirelessHART® devices may transmit new measurement values on a non-periodic basis. Still further, it is important that the loss of communications in any wireless implementation be automatically treated by the controller in a manner that does not introduce a process disruption.

In response to these problems, methodologies have been developed to enable some process controllers, such as proportional-integral-derivative (PID) process controllers, to work effectively with slow measurement updates, non-periodic measurement updates and intermittent loss of communications, i.e., situations more frequently associated with wireless communication networks. In general, these control methodologies receive and process unreliable or non-periodically received feedback signals (e.g., intermittently received process variable measurements) while still controlling a process loop adequately. These systems thus enable, for example, a PID controller to operate properly without receiving new process variable measurements for each execution cycle of the process control routine. In particular, U.S. Pat. Nos. 7,620,460; 7,587,252; and 7,945,339 and U.S. Patent Application Publication No. 2008/0082180, each of which is expressly incorporated by reference herein, describe how, for example, a PID control routine may be modified to perform closed loop control using a wireless transmitter that performs intermittent communications, thereby enabling process variable measurements to be communicated to the controller via a wireless communications link only when the process variable changes a particular amount.

While effective, these new control techniques generally modify the manner in which a PID control routine or a PID control block handles the intermittently received process variable measurements at the input of the controller or the control routine. However, there are many types of control techniques, including some PID based control schemes, that use estimates of process variables as inputs to the controller instead of using measured process variable values and control signals as inputs to the controller. For example, process control techniques that use Kalman filters typically operate on the measured process variable value to produce an estimate of the process variable value, which is then provided to the control routine for generating a control signal. In these cases, the intermittently received process variable measurements signals are not provided directly to the control routine. Still further, traditional Kalman filters assume the presence of zero-mean process or measurement noise within the process when producing an estimate of the process variable value. In processes in which this assumption is not correct, the Kalman filter based control system may operate poorly.

SUMMARY

A Kalman filter based control system or technique enables the use of received process variable values from a process that exhibits non-zero mean process or measurement noise and/or process variable values that are transmitted in a slow or intermittent manner without the need to change the control algorithm. The control system includes a controller, such as a PID controller, and a Kalman filter coupled to receive feedback in the form of, for example, intermittently measured or sent process variable measurement signals from a process, in which the process variable measurements may exhibit non-zero mean noise. The Kalman filter is configured to produce an estimate of the process variable value from the received process feedback signals while providing a new process variable estimate to the controller to enable the controller to produce a control signal used to control the process.

If desired, the Kalman filter may receive process variables in a continuous or a slow or intermittent manner. In any case, the Kalman filter may use one or more process models to generate an estimate of a received process variable to be provided at the input of the controller for use in producing a control signal for controlling the process, such as for use in controlling the process variable being estimated. Continuously received process variable measurements may be communicated to the Kalman filter via, for example, a wired communication network, while slow or intermittently received process variable measurements may be communicated to the Kalman filter via, for example, a wireless communication network. However, the slow or intermittently received process variable measurements could also be sent via a hardwired or other type of communication network if so desired. Moreover, while the controller may, for example, include and execute a PID control algorithm, the controller may execute or perform other desired types of controller algorithms, such as MPC, neural network or other model or non-model based control algorithms.

The Kalman filter may operate once during each of a number of execution cycles to produce a process variable estimate to be delivered to the controller, and may include a control signal input coupled to receive the control signal produced by the control routine unit, an interface including a process variable feedback input that receives a process variable measurement signal less frequently than once per the execution cycle time of the Kalman filter, and a process model coupled to receive the control signal at the control signal input to produce an initial process variable estimate. The Kalman filter may also include a correction unit coupled to use the process variable measurement signal received via the process variable feedback input to produce a correction signal from a residual, wherein the correction unit includes a first combiner, a switch unit and a gain unit. Still further, the Kalman filter may include a second combiner coupled to the process model and to the correction unit to combine the initial process variable estimate with the correction signal to produce a further process variable estimate. In this case, during the execution cycle of the Kalman filter unit at which a new value of the process variable measurement signal is available and during a predetermined number of execution cycles after the execution cycle at which a new value of the process variable measurement signal is available, the switch unit operates to provide a new value of the residual to the gain unit to produce the correction signal, wherein the new value of the residual is determined by combining the initial process variable estimate with a value of the process variable measurement signal at the first combiner. However, during execution cycles of the Kalman filter unit after the predetermined number of execution cycles after the execution cycle at which a new value of the process variable measurement signal is available, the switch unit operates to provide a stored value of the residual to the gain unit to produce the correction signal, wherein the stored value of the residual is determined during the last execution cycle of the predetermined number of execution cycles. In one case, the predetermined number of execution cycles and in other cases the predetermined number of execution cycles is greater than one.

When the process measurement signal is received in a slow, intermittent or otherwise non-periodic manner, the interface sets a flag or another marker to indicate the receipt of a new value of the process measurement signal. Once the new value flag is set, and for a predetermined number of execution cycles thereafter, the Kalman filter may calculate a new gain value, such as a new Kalman gain value, and a new residual value to develop the correction signal. On the other hand, when the new value flag is not set and after the predetermined number of execution cycles thereafter, the Kalman filter may use a stored gain value and a stored residual value to create the correction signal. The stored gain or residual value is calculated during, for example, the last execution cycle of the predetermined number of execution cycles after the new value flag is set. In other words, after the initial execution cycle at which a new value of the process variable or process signal is available at the Kalman filter input, the Kalman filter waits the predetermined number of execution cycles before calculating the gain or residual value for use during further execution cycles at which a new value of the process variable or process signal is not available.

Moreover, if the process includes process noise with a non-zero mean value, then an offset may exist between the process variable measurement and the process variable estimate. To remove this offset, the Kalman filter may include a compensation unit that produces a compensation signal and another combiner that combines the compensation signal with the process variable estimate to produce a compensated process variable estimate. In this regard, the Kalman filter provides a more accurate process variable estimate to the controller for use in process control, especially in process control that has non-zero mean value noise. In general, the Kalman filter may use the compensation unit for any continuous, wireless and/or intermittent process control communications.

In one embodiment, a control system for use in controlling a process includes a control unit having a process variable input and a control routine unit communicatively coupled to the process variable input, wherein the control routine unit generates a control signal for use in controlling the process based on a process variable value received at the process variable input. The control system further includes a Kalman filter unit coupled to the control unit, the Kalman filter unit operating once during each of a number of execution cycles to produce a process variable estimate. In this case, the Kalman filter unit includes a control signal input coupled to receive the control signal produced by the control routine unit, an interface including a process variable feedback input that receives a process variable measurement signal less frequently than once per the execution cycle time of the Kalman filter unit, and a process model coupled to receive the control signal at the control signal input to produce an initial process variable estimate. The Kalman filter unit also includes a correction unit coupled to use the process variable measurement signal received via the process variable feedback input to produce a correction signal from a residual. The correction unit includes a first combiner, a switch unit and a gain unit. Further, a second combiner is coupled to the process model and to the correction unit to combine the initial process variable estimate with the correction signal to produce a further process variable estimate. During the execution cycle of the Kalman filter unit at which a new value of the process variable measurement signal is available and during a predetermined number of execution cycles after the execution cycle at which a new value of the process variable measurement signal is available, the switch unit operates to provide a new value of the residual to the gain unit to produce the correction signal. The new value of the residual is determined by combining the initial process variable estimate with a value of the process variable measurement signal at the first combiner. However, during execution cycles of the Kalman filter unit after the predetermined number of execution cycles after the execution cycle at which a new value of the process variable measurement signal is available, the switch unit operates to provide a stored value of the residual to the gain unit to produce the correction signal, wherein the stored value of the residual is determined during the last execution cycle of the predetermined number of execution cycles. Still further, the process variable input of the control unit is coupled to receive the process variable estimate based on the further process variable estimate to thereby operate to perform control of the process using this process variable estimate. If desired, the process variable estimate is the further process variable estimate.

Furthermore, the gain unit may multiply a value of the residual by a gain value to produce the correction signal. As such, during the execution cycle of the Kalman filter unit at which a new value of the process variable measurement signal is available and during the predetermined number of execution cycles after the execution cycle at which a new value of the process variable measurement is available, the gain unit operates to determine a new gain value for use in the gain unit. However, during the execution cycles of the Kalman filter unit after the predetermined number of execution cycles after the execution cycle at which a new value of the process variable measurement signal is available, the gain unit operates to use a stored gain value, wherein the stored gain value is determined during the last execution cycle of the predetermined number of executions cycles.

Still further, the Kalman filter unit may include a compensation unit coupled to use the residual to produce a compensation signal. The compensation unit may include a further gain unit that multiplies a value of the residual by a further gain value and a filter unit that receives the value of the residual multiplied by the further gain value to produce the compensation signal. Additionally, the Kalman filter unit may include a third combiner coupled to the second combiner and to the compensation unit to combine the further process variable estimate with the compensation signal to produce the process variable estimate to thereby operate to perform control of the process using this process variable estimate. If desired, the control unit may store and execute or use any desired type of control routine, and may, for example, store and implement a proportional-integral-derivative control algorithm to produce the control signal.

In another embodiment, a method of controlling a process includes implementing, on a computer processor device, a control routine during each of a number of execution cycles to produce a control signal for use in controlling the process. This method receives, at a computer processor device, a process variable measurement signal less frequently than the execution cycle time rate and implements, on a computer processor device, a Kalman filter routine during each of the number of execution cycles to produce the process variable estimate. The method implemented to accomplish the Kalman filter routine includes receiving the control signal produced by the control routine during each of the number of execution cycles, producing an initial process variable estimate using a process model to model the reaction of the process to the control signal during each of the number of execution cycles, and producing a correction signal from a residual during each of the number of execution cycles. The Kalman filter routine method also combines, during each of the number of execution cycles, the initial process variable estimate with the correction signal to produce a further process variable estimate. The Kalman filter routine method then produces a process variable estimate based on the further process variable estimate. If desired, the process variable estimate is the further process variable estimate. In any event, during the execution cycle at which a newly received value of the process variable measurement signal is available and during a predetermined number of execution cycles after the execution cycle at which a newly received value of the process variable measurement is available, producing the correction signal from the residual includes using a new value of the residual, wherein the new value of the residual is determined by combining the initial process variable estimate with a received value of the process variable measurement signal. However, during execution cycles after the predetermined number of execution cycles after the execution cycle at which a newly received value of the process variable measurement signal is available, producing the correction signal from the residual includes using a stored value of the residual, wherein the stored value of the residual is determined during the last execution cycle of the predetermined number of execution cycles. If desired, the Kalman filter routine method also includes determining a compensation signal and combining the further process variable estimate with the compensation signal to produce the process variable estimate during each of the number of execution cycles.

In still another embodiment, a Kalman filter that operates to produce a compensated process variable estimate includes an interface having a process variable feedback input that receives a process variable measurement signal. The Kalman filter also includes a control signal input that receives a control signal, a process model coupled to receive the control signal at the control signal input to produce an initial process variable estimate, and a correction unit coupled to use a process variable measurement signal received via the process variable feedback input to produce a correction signal. In this case, the correction unit includes a first combiner that combines the initial process variable estimate with a received process variable measurement signal to determine a residual and a gain unit that combines the residual with a gain value to produce the correction signal. Further, the Kalman filter includes a second combiner coupled to the process model and to the correction unit that combines the initial process variable estimate with the correction signal to produce a further process variable estimate. Still further, the Kalman filter includes a compensation unit coupled to use the residual to produce a compensation signal. The compensation unit includes a further gain unit that combines the residual with a further gain value and a filter unit that receives the residual combined with the further gain value to produce the compensation signal. Additionally, the Kalman filter includes a third combiner coupled to the second combiner and to the compensation unit to combine the further process variable estimate with the compensation signal to produce the compensated process variable estimate.

If desired, the Kalman filter may operate at an execution cycle rate to produce the compensated process variable estimate during each of a number of execution cycles. In one case, the interface may receive the process variable measurement signal at a rate greater than or equal to the execution cycle rate.

In another case, the interface may receive the process variable measurement signal at a rate less than the execution cycle rate. Here, the correction unit may further include a switch unit. As such, during the execution cycle of the Kalman filter at which a new value of the process variable measurement signal is available and during a predetermined number of execution cycles after the execution cycle at which a new value of the process variable measurement signal is available, the switch unit may operate to provide a new value of the residual to the gain unit to produce the correction signal, wherein the new value of the residual is determined by combining the initial process variable estimate with a value of the process variable measurement signal at the first combiner of the correction unit. However, during execution cycles of the Kalman filter after the predetermined number of execution cycles after the execution cycle at which a new value of the process variable measurement signal is available, the switch unit may operate to provide a stored value of the residual to the gain unit to produce the correction signal, wherein the stored value of the residual is determined during the last execution cycle of the predetermined number of execution cycles.

In yet another embodiment, a Kalman filter adapted to execute on a computer processor to produce a compensated process variable estimate includes an interface routine stored in a non-transitory computer readable medium and adapted to execute on the processor to receive a process variable measurement signal and to receive a control signal used to control a process. The Kalman filter also includes a process modeling routine stored in the non-transitory computer readable medium and adapted to execute on the processor to use the control signal to produce an initial process variable estimate and includes a correction routine stored in the non-transitory computer readable medium and adapted to execute on the processor to combine the initial process variable estimate with a received process variable measurement signal to determine a residual. The correction routine combines the residual with a gain value to produce a correction signal. A combiner routine stored in the non-transitory computer readable medium and adapted to execute on the processor combines the initial process variable estimate with the correction signal to produce a further process variable estimate. Further, the Kalman filter includes a compensation routine stored in the non-transitory computer readable medium and adapted to execute on the processor to combine the residual with a further gain value and to filter the residual combined with the further gain value to produce a compensation signal. A further combiner routine stored in the non-transitory computer readable medium and adapted to execute on the processor combines the further process variable estimate with the compensation signal to produce the compensated process variable estimate.

If desired, the Kalman filter may be adapted to execute on the processor at an execution cycle rate to produce the compensated process variable estimate during each of a number of execution cycles. In one case, the interface routine may receive the process variable measurement signal at a rate greater than or equal to the execution cycle rate.

In another case, the interface routine may receive the process variable measurement signal at a rate less than the execution cycle rate. Here, the correction routine may further include a switching routine. As such, during the execution cycle of Kalman filter at which a new value of the process variable measurement signal is available and during a predetermined number of execution cycles after the execution cycle at which a new value of the process variable measurement signal is available, the switching routine operates to provide a new value of the residual to be combined with the gain value to produce the correction signal. However, during execution cycles of the Kalman filter after the predetermined number of execution cycles after the execution cycle at which a new value of the process variable measurement signal is available, the switching routine operates to provide a stored value of the residual to be combined with the gain value to produce the correction signal, wherein the stored value of the residual is determined during the last execution cycle of the predetermined number of execution cycles.

BRIEF DESCRIPTION OF THE DRAWINGS

For a more complete understanding of the disclosure, reference should be made to the following detailed description and accompanying drawing figures, in which like reference numerals identify like elements in the figures, and in which.

Figure 1:
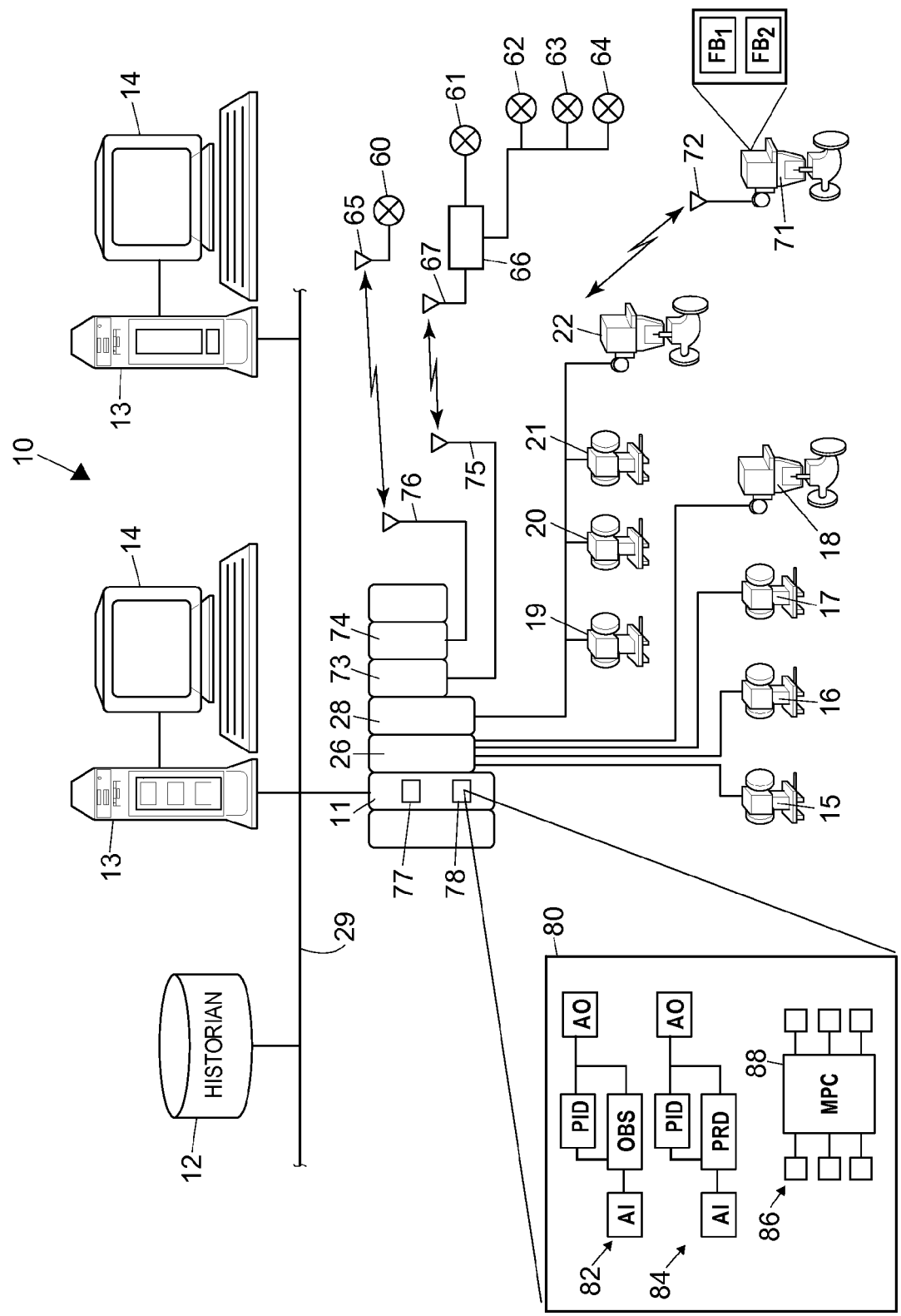
FIG. 1 is a schematic representation of a process control system having a controller configured to implement one or more control routines using predictors, such as Kalman filters, which may, in turn, use non-periodically or intermittently received communications transmitted via one or more slow or wireless communication networks.

While the disclosed system and method are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION

FIG. 1 depicts a process control system 10 that may be used to implement a control routine using predictor based control, and based on the receipt of intermittent, slow or non-periodic process variable measurements, while still providing highly accurate control of a process. Generally speaking, the process control system 10 of FIG. 1 includes a process controller 11 connected to a data historian 12 and to one or more host workstations or computers 13 (which may be any type of personal computers, workstations, etc.), each having a display screen 14. The controller 11 is also connected via hardwired communication connections to field devices 15-22 via input/output (I/O) cards 26 and 28. The data historian 12 may be any desired type of data collection unit having any desired type of memory and any desired or known software, hardware or firmware for storing data and, while being illustrated as a separate device, may instead or in addition be part of one of the workstations 13 or another computer device, such as a server. The controller 11, which may be, by way of example, a DeltaV™ controller sold by Emerson Process Management, is communicatively connected to the host computers 13 and to the data historian 12 via a communication network 29 which may be, for example, an Ethernet connection.

The controller 11 is illustrated as being communicatively connected to the field devices 15-22 using a hardwired communication scheme which may include the use of any desired hardware, software and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 mA devices that communicate over analog lines to the I/O card 26, while the field devices 19-22 are smart devices, such as Fieldbus field devices, that communicate over a digital bus to the I/O card 28 using Fieldbus protocol communications. Of course, the field devices 15-22 may conform to any other desired standard(s) or protocols, including any standards or protocols developed in the future.

In addition, the process control system 10 includes a number of wireless field devices 60-64 and 71 disposed in the plant to be controlled. The field devices 60-64 are depicted in FIG. 1 as being transmitters (e.g., process variable sensors) while the field device 71 is depicted as being a valve. However, these field devices may be any other desired types of devices disposed within a process to implement physical control activities or to measure physical parameters within the process. Wireless communications may be established between the controller 11 and the field devices 60-64 and 71 using any desired wireless communication equipment, including hardware, software, firmware, or any combination thereof now known or later developed. In the example case illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61-64. Likewise, an antenna 72 is coupled to the valve 71 to perform wireless communications for the valve 71. The field devices or associated hardware 60-64, 66 and 71 may implement protocol stack operations used by an appropriate wireless communication protocols to receive, decode, route, encode and send wireless signals via the antennas 65, 67 and 72 to implement wireless communications between the controller 11 and the transmitters 60-64 and the valve 71.

If desired, the transmitters 60-64 may constitute the sole link between various process sensors (transmitters) and the controller 11 and, as such, are relied upon to send accurate signals to the controller 11 to ensure that product quality and flow are not compromised. The transmitters 60-64, often referred to as process variable transmitters (PVTs), therefore may play a significant role in the control of the plant. Additionally, the valve or other field device 71 may provide measurements made by sensors within the valve 71 or may provide other data generated by or computed by the valve 71 to the controller 11 as part of the operation of the valve 71, including data collected by, computed by or otherwise generated by the function blocks FB1 and FB2 executed within the valve 71. Of course, the valve 71 may also receive control signals from the controller 11 to effect physical parameters, e.g., flow, within the plant.

The controller 11 is coupled to one or more I/O devices 73 and 74, each connected to a respective antenna 75 and 76, and these I/O devices and antennas 73-76 operate as transmitters/receivers to perform wireless communications with the wireless field devices 61-64 and 71 via one or more wireless communication networks. The wireless communications between the field devices (e.g., the transmitters 60-64 and valve 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode and send wireless signals via the antennas 75 and 76 to implement wireless communications between the controller 11 and the transmitters 60-64 and the valve 71.

As illustrated in FIG. 1, the controller 11 includes a processor 77 that implements or oversees one or more process control routines (or any module, block, or subroutine thereof) stored in a memory 78. The process control routines stored in the memory 78 may include or be associated with control loops being implemented within the process plant. Generally speaking, the controller 11 executes one or more control routines and communicates with the field devices 15-22, 60-64, and 71, the host computers 13 and the data historian 12 to control a process in any desired manner(s). However, it should be noted that any control routines or modules described herein may have parts thereof implemented or executed in a distributed fashion across multiple devices. As a result, a control routine or a module may have portions implemented by different controllers, field devices (e.g., smart field devices) or other devices or other control elements, if so desired.

Likewise, the control routines or modules described herein to be implemented within the process control system 10 may take any form, including software, firmware, hardware, etc. Any device or element involved in providing such functionality may be generally referred to herein as a "control element," regardless of whether the software, firmware, or hardware associated therewith is disposed in a controller, a field device, or any other device (or collection of devices) within the process control system 10. Of course, a control module may be any part or portion of a process control system including, for example, a routine, a block or any element thereof, stored on any computer readable medium. Such control modules, control routines or any portions thereof may be implemented or executed by any element or device of the process control system 10, referred to herein generally as a control element. Moreover, control routines, which may be modules or any part of a control procedure such as a subroutine, parts of a subroutine (such as lines of code), etc., may be implemented in any desired software format, such as object oriented programming, ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. As a result, the controller 11 may be configured to implement a control strategy or control routine in any desired manner.

In some embodiments, the controller 11 implements a control strategy or scheme using what are commonly referred to as function blocks, wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist and may be utilized herein. The function blocks may be stored in and executed by the controller 11, which is typically the case when the function blocks are used for, or are associated with standard 4-20 mA devices and some types of smart field devices such as HART® devices. Alternatively or additionally, the function blocks may be stored in and implemented by the field devices themselves, I/O devices, or other control elements of the process control system 10, which may be the case with systems utilizing Fieldbus devices. While the description of the control system 10 is generally provided herein using a function block control strategy, the disclosed techniques and system may also be implemented or designed using other conventions or programming paradigms.

In any event, as illustrated by the exploded block 80 of FIG. 1, the controller 11 may include a number of control modules (illustrated as modules 82, 84 and 86), wherein each control module implements one or more process control loops. In this case, the control module 82 implements an observer based control scheme or routine (which is referred to herein as one type of predictor based control scheme), and the control module 84 implements a predictor based control scheme. As an example, the observer and/or predictor based control scheme may be based on a Kalman filter. The modules 82 and 84 are illustrated as performing single loop control using an observer (OBS) or a predictor (PRD) and a single-input/single output based PID control block (PID) connected to appropriate analog input (AI) and analog output (AO) function blocks, which may be associated with process control devices such as valves, with measurement devices such as temperature and pressure transmitters, or with any other device within the process control system 10. A multiple input/multiple output control loop 86 is also illustrated as including an advanced control block 88 having inputs communicatively connected to one or more AI function blocks and outputs communicatively connected to one or more AO function blocks, although the inputs and outputs of the advanced control block 88 may be connected to any other desired function blocks or control elements to receive other types of inputs and to provide other types of control outputs. The advanced control block 88 may implement any type of multiple-input, multiple-output control scheme, including observer or predictor based control, and may constitute or include a model predictive control (MPC) block, a neural network modeling or control block, a multivariable fuzzy logic control block, a real-time-optimizer block, etc. It will be understood that the function blocks illustrated in FIG. 1 can be executed by the controller 11 or, alternatively, can be located in and executed by any other processing device or control element of the process control system, such as in one of the workstations 13 or in one or more of the field devices 19-22 or 60-64 or 71.

The observer/predictor based control modules 82, 84 and 86 of FIG. 1 have, in the past, generally been configured for periodic execution via multiple iterations of the control routine. In a conventional case, each iteration is supported by an updated process measurement provided by, for instance, a transmitter or other field device. There are typically multiple process measurements made between each of the periodic execution iterations to assure an up-to-date process measurement during each controller execution cycle. In fact, to avoid the restrictions of synchronizing the measurement value with the control, many past controllers (or control loops) were designed to over-sample the measurement by a factor of 2-10 times. Such over-sampling helped to ensure that the process measurement was current for use in the control scheme. Also, to minimize control variation, conventional designs specified that feedback control should be executed 4-10 times faster than the process response time. To satisfy these conventional design requirements, the measurement value had to be sampled much faster than the control execution rate, which was much faster or higher than the process response time.

Generally speaking, the observer/predictor based control modules of FIG. 1 (which will be described in greater detail herein) enable the transmission of the process variable measurement values (which includes other values such as computed or simulated values) at much lower rates, at intermittent rates or at non-periodic rates, so as to, for example, allow control in processes in which only intermittent process variable feedback communications exist or to reduce the consumption of power from the power supply powering, for example, a wireless sensor or transmitter (e.g., one of the transmitters 60-64) making the process variable measurements. In this later case, even if measurement and control execution are synchronized, as is the case in many Fieldbus control schemes, the conventional approach to scheduling control iterations 4-10 times faster than the process response may still result in too much power consumption during data transmission. Additionally, the observer/predictor control routines may perform observer based control in the presence of non-zero mean process or measurement noise within the measured process variable used as an input to the observer of the observer based control routine.

As will be discussed in more detail below, the predictor based control techniques described herein are particularly useful in the process control system 10, and in particular in the controller 11 and in the transmitting devices and other field devices of the control system 10, when these devices transmit or receive a new measurement or other value on a non-periodic or an intermittent basis, such as when certain conditions are satisfied. For example, a new measurement value may be transmitted based on whether the process variable has changed by more than a predetermined threshold (e.g., an amount determined to be significant). For example, if the magnitude of the difference between the new measurement value and the last communicated measurement value is greater than a specified resolution, then a trigger may be generated such that the measurement will be updated or sent. When dealing with discrete measurements (such as on/off measurements, a digital bit or other state measurements in which one of a predetermined set of states or discrete values is expected or measured), a change from one state to another is generally considered to exceed the threshold or resolution magnitude.

In other cases, a new measurement value may be transmitted when the difference exceeds the specified resolution (as in the prior case), as well as when the time since the last communication exceeds a predetermined refresh time. Here, either a change in the process variable or the passing of a default time, may result in a measurement transmission. The refresh, or default, time for measurement transmission may vary between control loops, inasmuch more or less frequent updates may be suitable depending on whether the process is slow moving or rapid in response (as indicated, for instance, by the process time constant). In some cases, a determination may be made during the tuning of the control loop based on the time constant, and adjusted thereafter as desired. For example, the time between measurements or sending of signals may be dependent on the measured state of the variable or value and, in this case, the period of measurement can be adjusted to reflect the state of the device, equipment, or process that is being monitored. In any case, the default or refresh time acts as an integrity check, or override, after periods of time without a measurement update. Such checks may be useful to, for instance, facilitate the final drive of the process variable to a target.

In the meantime, the transmitter, sensor or other field device responsible for obtaining the measurement values may still periodically sample the measurement at any desired rate, such as the conventional 4-10 times the process response time. The communication techniques then determine whether the sampled values are transmitted to the controller 11.

However, the underlying assumption in standard control design (e.g., using z transform, difference equations, etc.) and digital implementation of the control routines, such as proportional-integral-derivative (PID) control, is that the control algorithm is executed on a periodic basis. If the measurement is not updated during each execution cycle, then steps such as the integral (or reset) portion or contribution of the routine may not be appropriate. For example, if the control algorithm continues to execute using the last, outdated measurement value, then the output will continue to move based on the reset tuning and the error between the last measured value and the set point. On the other hand, if the control routine is only executed when a new measurement is communicated, then the control response to setpoint changes and feedforward action on measured disturbances could be delayed. Control routines may also include calculations based on the time elapsed since the last iteration. However, with non-periodic and/or less frequent measurement transmissions, calculating the reset contribution based on the control execution period (i.e., the time since the last iteration) may result in increased process variability.

In view of the foregoing challenges, and to provide accurate and responsive control when process variable measurement values are not updated on a periodic basis, control techniques may be used that generally modify the process control routine based on whether an update of the process variable is available. In some cases, a predictor based control routine may be restructured in accordance with the techniques described herein based on the expected process response since the last measurement update.

While the control techniques described below are useful in, and are especially applicable to control routines that implement communications via wireless communication networks, it should be noted that these techniques are applicable to communications implemented via hardwired connections as well. For example, one or more of the hardwired devices 15-22 may also rely on a limited power supply or otherwise benefit from reduced data transmission rates. In addition, the process control system 10 may include a sampled analyzer or other sampling system designed to provide measurement data via hardwired communication networks intermittently or at rates slower than the control execution rate.

Further, the control techniques described below are adapted to eliminate any offset between the process variable measurement values and process variable estimate values caused by the presence of process noise with non-zero mean value. This compensation for non-zero mean value noise may be performed regardless of whether the control techniques are implemented via wired or wireless communication networks.

Figure 2:
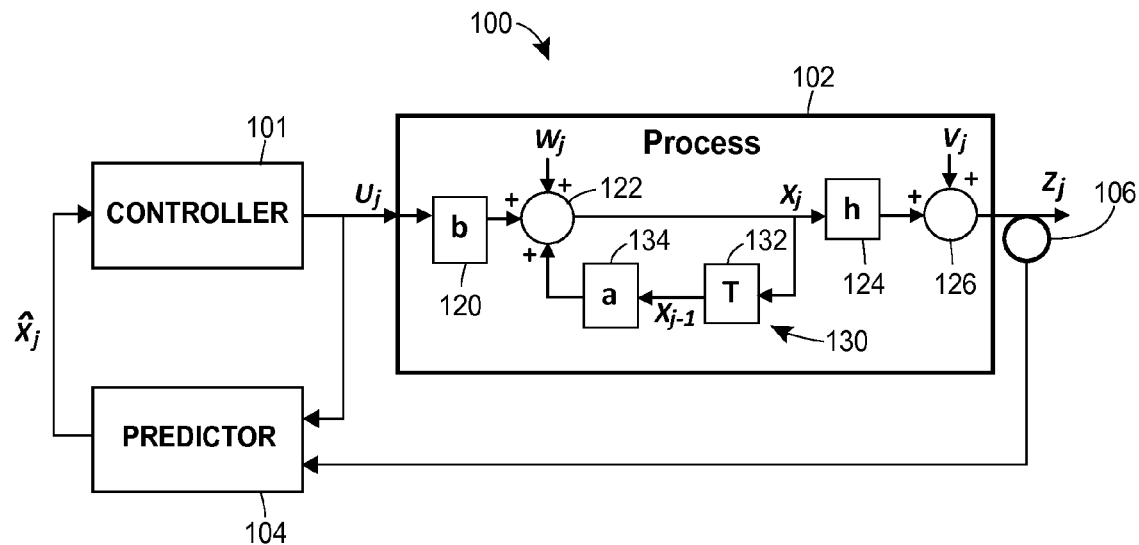
FIG. 2 is a schematic representation of a known predictor based control scheme that receives periodically generated process variable measurement signals via a wired communication link, including a manner of modeling the process being controlled.

For the sake of illustration, FIG. 2 depicts a typical prior art, predictor based control system 100 having a controller 101 connected to a process 102, and including a predictor 104 connected between the controller 101 and the process 102. As illustrated in FIG. 2, the controller 101, which may be for example, a PID controller (which includes any of P, PI, PD, ID and PID type controllers) produces a control signal $U_j$ that controls the operation of some device, such as a valve, within the process 102 to affect or change the value of a controlled process state variable $X_j$. Moreover, a transmitter 106 measures or samples a process variable effected by the control operation to produce process output values $Z_j$. In this case, the process output values $Z_j$ may be measured values of the process state variable $X_j$ or may be measured values of some other process variable that is associated with or that changes in some known relationship to the process state variable $X_j$. The transmitter 106 provides the measurement output values $Z_j$ to the predictor 104 which may be an observer, as an example. In this case, the transmitter 106 is illustrated as being a wired transmitter and so communicates measured process output values $Z_j$ to the predictor 104 via a wired communication network. Also, as noted above, the transmitter 106 typically measures and sends new process output values $Z_j$ at a rate 4-10 times faster than the execution rate of the controller 101.

As illustrated in FIG. 2, the predictor 104, which may be for example, a Kalman filter uses the received measured process output values $Z_j$ in conjunction with the control signal $U_j$ produced by the controller 101 to develop an estimate of the process state variable $\hat{X}_j$ which is then provided as an input to the controller 101 for use in controlling the process 102 and, in particular, to control the value of the process state variable $X_j$. The use of the predictor 104 enables the process control system 10 to account for such things as measurement delay, measurement errors, process noise, etc., to enable the controller 101 to perform better or more accurate control of the process 102. It should be noted that the predictor 104 typically operates on the same or a faster execution cycle than the controller 101 so that a new valve of the process state variable estimate $\hat{X}_j$ available at the input of the controller 101 at each execution cycle of the controller 101. As such, it is typical to provide a new process measurement output value $Z_j$ to the input of the predictor 104 at a rate that is equal to or greater (e.g., 4-10 times greater) than the execution rate of the predictor 104.

Generally speaking, a predictor, such as the predictor 104 of FIG. 2, assists in process control by providing a process variable estimate using a model of the process. For example, many industrial process units are characterized by one manipulated input, U(t), and one measured process output, Z(t). The model of a liner processes with one manipulated input and one measured process output may be expressed in state variable format as:

$$X_j = aX_{j-1} + bU_j$$

$$Z_j = hX_j$$

wherein:
$X_j$=process state at time j;
$U_j$=process input at time j;
$Z_j$=process output measurement at time j;
a and b=constants defining the process gain and dynamic response; and
h=process output gain/unit conversion gain.
For example, the state variable representation of a first order process may be expressed in this format where:

$$a = e^{\frac{-\Delta T}{\tau}}, b = k(1 - e^{\frac{-\Delta T}{\tau}})$$

wherein:
k=process gain;
$\tau$=process time constant;
$\Delta T$=period of execution of process model; and
j=current time instance.
For an integrating process, the state variable representation of a first order process may be expressed in this format where:
a=1; and
b=$\Delta T \cdot k_1$.

To aid in the discussion, the process 102 depicted in FIG. 2 is illustrated in a mathematical form provided above, to illustrate the various sources of errors and other operations inherent in most processes, and to enable a better understanding of the predictor 104. In particular, the process 102 is modeled by process gain block 120, a summer 122, a conversion block 124, a summer 126 and a feedback loop 130 including a delay unit 132 and a gain unit 134. To depict the mathematical operation of the process 102, the gain unit 120 multiplies the control signal $U_j$ produced by controller 101 by a process gain b, and this value is added (in the summer 122) to process noise $W_j$ and a dynamic response that is estimated by or modeled by the feedback loop 130 to produce the process state variable $X_j$. The process noise $W_j$ may be assumed to be, for example, Gaussian white noise, or zero mean white noise with covariance Q that is uncorrelated with the input, although other types of noise models may be used instead. Thus, the process state variable $X_j$ is mathematically modeled as the sum of output of the process gain block 120, the process noise $W_j$ and the dynamic gain response. In this case, the dynamic gain response at the input of the summer 122 is produced by or modeled by the feedback loop 130, in which the process state variable $X_j$ is delayed by one sampling or controller execution time in the delay unit 132, and the delayed version of the process state variable $X_{j-1}$ is multiplied by the process dynamic response gain a. As will be understood, the process gain b and the dynamic process response gain a are typically modeled as constants, but may be updated (periodically or otherwise) based on the actual operation of the process 102.

Within the process 102, the process state variable $X_j$ is illustrated as being converted in the conversion unit 124 by being multiplied by the value h, which provides for or models the unit conversion between the units of the process state variable $X_j$ and the measured process output value $Z_j$. The summer 126 then sums the converted process state variable value produced by the block 124 with a value $V_j$ which represents the process measurement noise (e.g., the noise added to the process variable value due to measurement errors or inaccuracies). If desired, the measurement noise $V_j$ may be white noise with zero mean and covariance R that is uncorrelated with the input or the process noise $W_j$. The output of the summer 126 represents the process output value $Z_j$ which is an estimate of the value of the process state variable $X_j$ including the effects of process noise, process dynamics, process gain and having errors therein due to measurement noise. Of course, as illustrated in FIG. 2, the transmitter 106 produces or measures the "noisy" process output value $Z_j$ and provides this value to the predictor 104.

As noted above, the transmitter 106 will typically produce a process measurement output value $Z_j$ multiple times per operation cycle of the controller 101 and/or per operational cycle of the predictor 104, so as to enable the predictor 104 to produce a valid and up-to-date estimate $\hat{X}_j$ of the actual process state variable $X_j$ based on the process output measurements $Z_j$ provided thereto by the transmitter 106.

Figure 3:
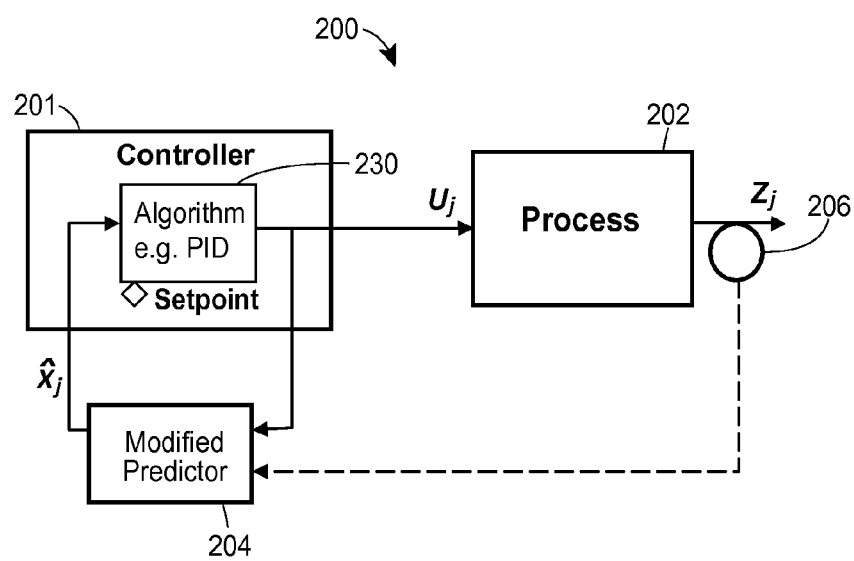
FIG. 3 is a schematic representation of process control system that uses a process controller and a modified predictor to control a process, in which the modified predictor receives a process variable measurement signal in a slow, non-periodic, or intermittent manner via a wireless communication link.

FIG. 3 illustrates a new process control system 200 including a process controller 201 (which may be the same as the process controller 101 FIG. 2) that controls a process 202. As illustrated in FIG. 3, the process controller 201 includes a controller algorithm, such as PID controller algorithm 230, which produces a control signal $U_j$ to control or drive the process 202. In this case, however, the control system 200 includes a modified predictor 204 connected to the controller 201 and to a transmitter 206. The modified predictor 204 receives an output of the transmitter 206 which, in this case, is provided wirelessly to the modified predictor 204 via a wireless communication network (indicated by the dotted line in FIG. 3). The modified predictor 204 operates to produce an estimated (predictor or observed) value of the process state variable $\hat{X}_j$ on the control signal $U_j$ and the measured process output value $Z_j$ as measured by transmitter 206, and provides the estimated process state variable $\hat{X}_j$ to the input of the PID controller algorithm 230 for use in producing the control signal $U_j$.

Here, the output of the wireless transmitter 206 (i.e., the process measurement output signal $Z_j$) is provided wirelessly over a wireless communication network to the modified predictor 204 and, as such, may be provided non-periodically, intermittently, or at a rate that is slower than the execution cycle rate of the controller 201 or the execution cycle rate of the predictor 204. As a result, in this case, a new value of the measured process output $Z_j$ may not be, and is generally not available at the input of the predictor 204 at the start of each new execution cycle of the predictor 204. Nonetheless, the modified predictor 204 still operates in manners described below to produce a new process state variable estimate $\hat{X}_j$ to the input of the controller 201 or the control routine 230 during each controller execution cycle.

As noted above, in the past, observer/predictor based controller algorithms, such as PID algorithms, tied to predictors such as Kalman filters assumed that the process variable measurements were up-to-date and, in fact, accurate at the start of each controller execution cycle. These algorithms also assumed that the measured process variable (the same variable being estimated by the Kalman filter) includes only non-zero mean noise. As a result, the use of a wireless transmitter other mechanism that provides slow or intermittent process variable measurement values to a typical observer/predictor may cause problems and lead to poor control performance. The modified predictor 204, however, operates in manners described below to minimize or alleviate the issues associated with the receipt of intermittent or slow process feedback signals at the controller or observer/predictor inputs.

Figure 4:
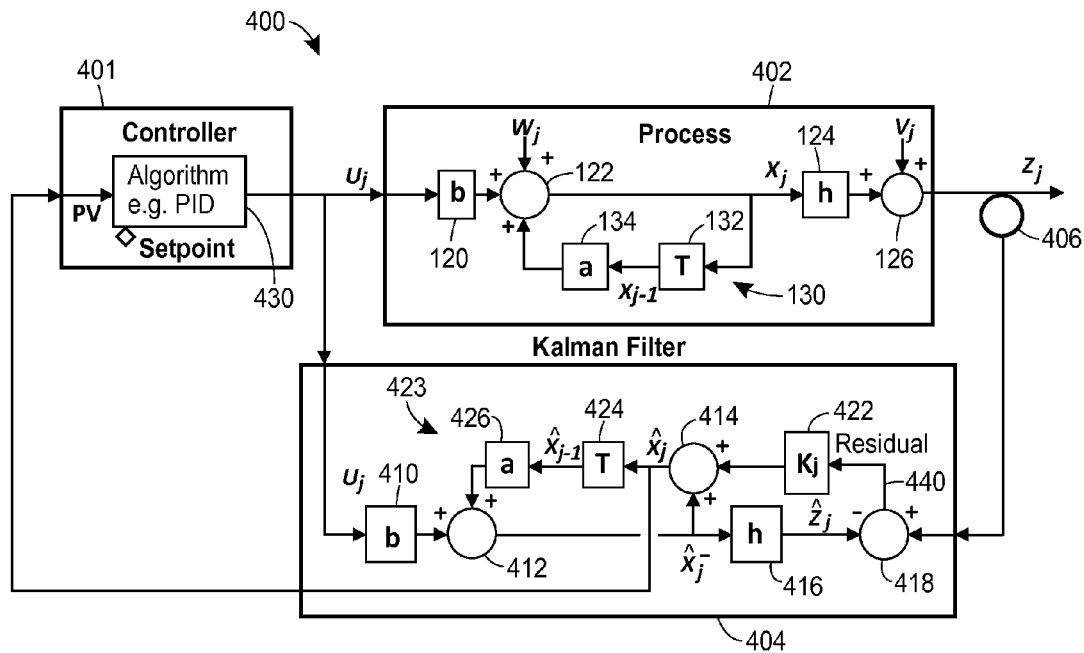
FIG. 4 is a schematic representation of a known controller and a Kalman filter, wherein the Kalman filter is connected to a process to receive periodic measurements of a process variable via a wired communication link.

Before describing the specifics of the modified predictor 204 of FIG. 3, it will be helpful to describe the typical operation of one known type of predictor, in the form of a Kalman filter, which is generally a predictor that corrects for model inaccuracies during operation of the prediction unit. FIG. 4 illustrates a typical predictor based control system 400 having a controller 401 coupled to a process 402 that uses a Kalman filter 404 that receives periodic process feedback signals from a wired transmitter 406. For the sake of this discussion, the process 402 is assumed to operate in the same manner as described for the process 102 of FIG. 2, and thus the blocks illustrated in the process 402 of FIG. 4 are numbered the same as corresponding blocks in the process 102 of FIG. 2.

Generally speaking, a Kalman filter is typically used to control a process when the process is characterized by substantial process or measurement noise, as the Kalman filter can be used to reduce the impact of process or measurement noise on a control application. In particular, the Kalman filter generally produces an estimated process output for control, as will be described in more detail below, wherein:

$\hat{X}_j^-$=the a priori estimate of the process state (an initial process state variable estimate);
$\hat{X}_j$=estimate of the process state; and
$\hat{Z}_j$=estimate of the output.

In a general sense, a Kalman filter includes and uses a model of the process without process or measurement noise to produce an estimated process output value. The Kalman filter also includes a correction unit that determines the difference between the estimated process output and the measured process output as a residual, also known in the art as an innovation. The correction unit of the Kalman filter also includes a Kalman gain, $K_j$, which is set to determine what portion of the residual is used in the Kalman filter model to compensate for inaccuracies in the process model variables a, b, or h, and to account for the process or measurement noise.

Thus, as illustrated in FIG. 4, a typical Kalman filter 404 receives a measured process output $Z_j$, as measured by the wired transmitter or sensor 406, via hardwired or regularly scheduled communications, and produces an estimate of the process state variable $\hat{X}_j$ an output, which is, in turn, provided as a process variable input to the controller 401 (illustrated in FIG. 4 as a PID controller algorithm 430 being implemented by the controller 401.) The Kalman filter 404 includes a gain block 410, summers 412 and 414, a conversion block 416, a further summer 418, a Kalman gain block 422 coupled between the summer 418 and the summer 414, and a dynamic feedback loop 423 including a delay unit 424 and a gain block 426. Essentially, the blocks 410, 412, 424 and 426 form a process model that produces the initial process state variable estimate $\hat{X}_j^-$, the blocks 416, 418 and 422 form a correction unit that produces a correction signal at the output of the gain block 422 and the block 414 forms a combiner that combines the initial process state variable estimate $\hat{X}_j^-$ with the correction signal to form the process state variable estimate $\hat{X}_j$. As a result, the Kalman filter 404 is configured to produce an estimated non-noisy value for the process state variable $\hat{X}_j$ (which is an estimate of the process state variable $X_j$ within the process 402) based on a process gain b, a dynamic response gain a, and a Kalman filter gain $K_j$, as well as the current values of the control signal $U_j$ and the measured process output signal $Z_j$.

In particular, the gain unit 410 multiplies the control signal $U_j$ (from the controller 401) by an estimate of the process gain b, and this value is added in the summer 412 to a dynamic response (produced by the feedback loop 423) to produce an a priori estimated value of the process state variable, indicated as the variable $\hat{X}_j^-$. The dynamic gain response provided at the input of the summer 412 is produced by the feedback loop 423, in which the estimated process state variable $\hat{X}_j$ is delayed by one sampling or controller execution time in the delay unit 424, and the delayed version of the process state variable $\hat{X}_{j-1}$ is multiplied by the dynamic process response gain a. As will be understood, the process gain b and the dynamic process response gain a are typically modeled as constants, but may be updated (periodically or otherwise) based on the actual operation of the process 402. In any event, the a priori process state variable estimate $\hat{X}_j^-$ is then provided to the summer 414 which sums this variable value with a correction signal that corrects for the noise and model inaccuracies in the process model to produce the process state variable estimate $\hat{X}_j$ (also referred to as the observed process state variable value). In this case, the blocks 416, 418 and 422 produce the correction signal.

To produce the correction signal at the input of the summer 414, the a priori estimated process state variable $\hat{X}_j^-$ is converted in the conversion unit 416 by being multiplied by the value h, which provides for or models the units conversion between the units of the process state variable $\hat{X}_j^-$ and the measured process output $Z_j$ to produce what is still considered to be the initial process state variable estimate in the form of the estimated output value $\hat{Z}_j$. The summer 418 then subtracts (computes the difference between) the initial estimated value of the measured process output $\hat{Z}_j$ from the actual measured value of the process output $Z_j$ to produce a residual on a line 440. The residual is then multiplied in the block 422 by the Kalman filter gain $K_j$ to produce the correction signal for correcting for the noise in the process (e.g., the process measurement noise and the process noise) as well as to correct for model inaccuracies, such as inaccuracies in the gains a, b and h. Ultimately, the estimated process state variable $\hat{X}_j$ is provided as the input to the controller 401 for use in controlling the process 402. The Kalman gain $K_j$ and other variables of the Kalman filter 404 are typically generated once, or are regenerated during each execution cycle to determine proper control and to tweak the observer 404 to be more accurate.

More particularly, the Kalman gain $K_j$ may be assumed to be a constant if the process is noise free and the values of a, b, and h are accurately known. However, as is known, an optimal linear estimator may be achieved by dynamically calculating the Kalman gain $K_j$ in a recursive manner during each execution cycle of the Kalman filter in the following manner. First, an initial guess or estimate of the previous values may be established as:

$\hat{X}_{j-1}$=a posteriori state estimate $P_{j-1}$=a posteriori state covariance Then, in a predictor step, the following calculations may be made to determine the current values of the a priori estimate of the process state variable $\hat{X}_j^-$ and the a priori estimate of the process noise covariance $P_j^-$ as:

$\hat{X}_j^- = a\hat{X}_{j-1} + bU_j$ $P_j^- = a^2 P_{j-1} + Q$

Then, in an estimation step, the following calculations may be performed to determine a new value for the Kalman gain, the process state variable estimate $\hat{X}_j$, the state covariance $P_j$ and the estimated measured process output value $\hat{Z}_j$:

$$K_j = \frac{hP_j^-}{h^2 P_j^- + R}$$

$$\hat{X}_j = \hat{X}_j^- + K_j(Z_j - h\hat{X}_j^-)$$

$$P_j = P_j^-(1 - hK_j)$$

$$\hat{Z}_j = h\hat{X}_j^-$$

wherein:
$K_j$ is the Kalman gain;
R is the covariance of the measurement noise ($V_j$); and
Q is the covariance of the process noise ($W_j$).

After the initial run, the predictor step and the estimator step can be repeated each time the Kalman gain is recalculated, e.g., during each execution cycle.

Thus, as will be understood, the Kalman filter 404 of FIG. 4 attempts to estimate the actual value of the process state variable $X_j$, accounting for the process noise and measurement noise, for example, added by the transmitter or sensor 406, and provides this estimate of the process state variable $\hat{X}_j$, to the controller 401 as an input. Ultimately, the use of the Kalman filter 404, provides a better or more true estimate of the actual process state variable $X_j$ at the controller input for use in controlling the process 402, as opposed to using the measured or sensed value of the process output $Z_j$ as measured by the transmitter 406.

The Kalman filter of FIG. 4 works well when the process noise is assumed to have a zero mean value. However, when the mean value of the process noise is not zero (0), then for values of the Kalman gain $K_j$ that are less than 1/h, there will exist an offset between the measurement and estimate of the state. Thus, for many practical applications of a Kalman filter, modifications are needed in the Kalman filter to account for non-zero mean value noise.

Figure 5:
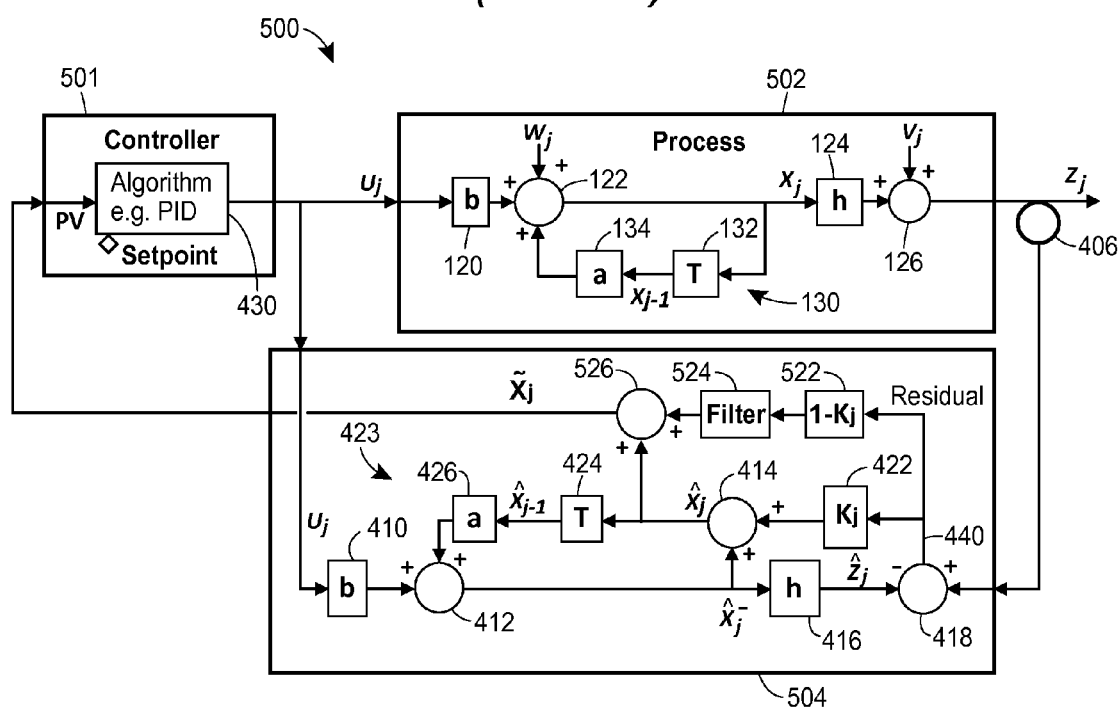
FIG. 5 is a schematic representation of a controller and a Kalman filter, used to control a process, wherein the Kalman filter is configured to receive periodic measurements of a process variable via a wired communication link and to compensate for non-zero mean value noise in the process.

FIG. 5 illustrates a Kalman filter based control system 500 having a controller 501 used to control a process 502, and a Kalman filter 504 that is modified to account for process noise with non-zero mean value. The Kalman filter 504 of FIG. 5 is essentially the same as that of FIG. 4 (and so like elements are numbered the same), except with the addition of a gain block 522, a filter block 524, and a summer 526. The blocks 522 and 524 form a compensation unit that produces a compensation signal at the output of the filter block 524 and the block 526 forms a combiner that combines the process state variable estimate $\hat{X}_j$ with the compensation signal to form a compensated process state variable estimate $\tilde{X}_j$. As a result, the Kalman filter 504 is configured to eliminate the offset caused by the process noise with non-zero mean value to produce an offset-free estimated non-noisy value of the process state variable.

To produce the compensation signal at the input of the summer 526, the computed residual from the summer 418 is first multiplied in the gain block 522 by one minus the Kalman gain $K_j$ and then fed to the filter block 524. The filter block 524 may be, for example, any type of first order filter, such as a low-pass filter, with a time constant that is approximately equal to the process response time (e.g., the process time constant plus any process dead time). The filter block 524 estimates the non-zero mean value of the process noise and provides, as an output, the necessary compensation signal to eliminate the offset caused by the non-zero mean value noise. The generated compensation signal is then combined with the estimated process state variable $\hat{X}_j$ to remove the noise offset inherent in the $\hat{X}_j$ value, which was calculated based on the measured process output $Z_j$ which includes the effects of the non-zero mean value noise. In this manner, the Kalman filter 504 of FIG. 5 accounts for any process noise having a non-zero mean value within the process 502 in order to provide a more accurate process state variable estimate to the controller 501. Of course, if the process noise in the process 502 has a zero mean value, then the compensation signal at the output of the filter block 524 will be zero or approximately zero.

Still further, the Kalman filters 404 of FIGS. 4 and 504 of FIG. 5 assume that a new measured output value $Z_j$ is available and provided by the transmitter 406 during every execution cycle of the Kalman filter 404 to enable the Kalman filter 404 or 504 to determine and to provide a new process variable estimate $\hat{X}_j$ to the controller 401 or a compensated process state estimate $\tilde{X}_j$ to the controller 501 at the beginning of each control execution cycle. However, when using a wireless transmitter or other system in which the measured signals are not sent to the Kalman filter at the same or greater rate than the execution rate of the controller 401 or 501, the use of the Kalman filter as illustrated in FIGS. 4 and 5 is not possible because new sample values are not available at each execution cycle.

Figure 6:
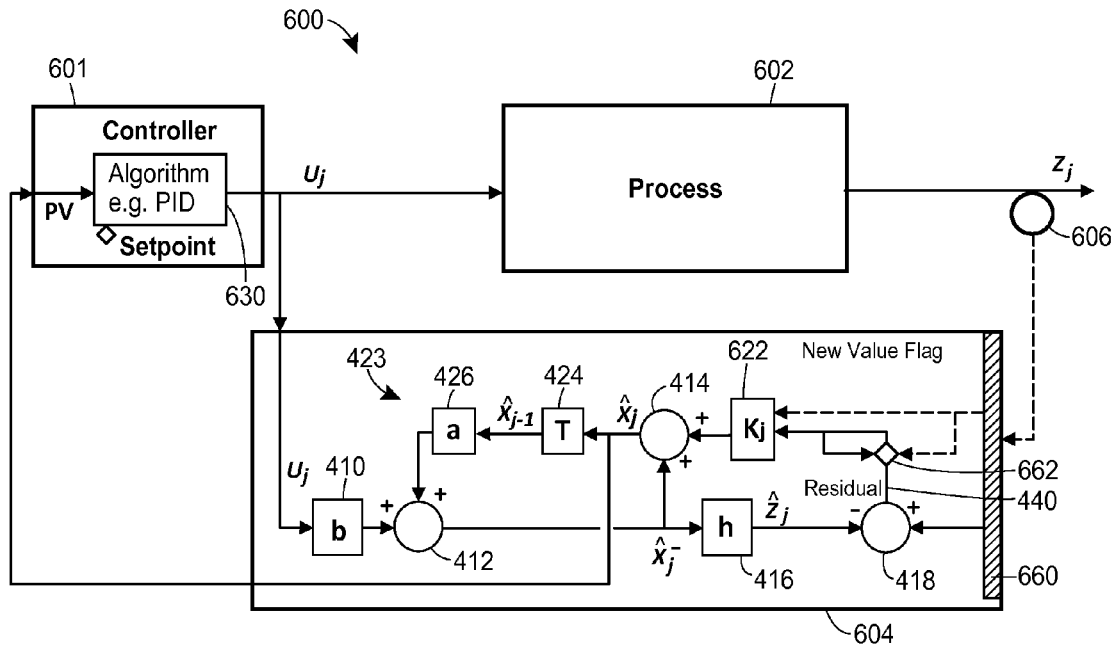
FIG. 6 is a schematic representation of a controller and a Kalman filter, used to control a process, wherein the Kalman filter is configured to receive non-periodic, intermittent or slow measurements of a process variable via a wireless communication link.

FIG. 6 illustrates a modified predictor based process control system 600, such as that generally illustrated in FIG. 3, in which a process controller 601 controls a process 602 which may be the same as the process 402 of FIG. 4. In this case, the modified predictor 204 of FIG. 3 is illustrated in FIG. 6 as a modified Kalman filter 604. The Kalman filter 604 is similar to the Kalman filter 404 of FIG. 4 except that it is adapted to deal with the receipt of intermittent, slow or non-periodic process measurements made in the process 602 or process measurements that otherwise arrive at a rate substantially slower than or less than the execution cycle rate of the Kalman filter 604 or the controller 601. In this case, the Kalman filter 604 of FIG. 6 includes the basic elements illustrated FIG. 4 (in which the same elements include the same reference numbers) and thus is generally adapted to be used for processes in which there is no significant process dead time or process response delay.

As denoted in FIG. 6, however, the modified Kalman filter 604 includes an input interface 660, which accepts or receives the process measurement output signals $Z_j$ sent by a wireless transmitter 606 (which may the same as the wireless transmitter 206 of FIG. 3). The receipt of the control signal at the Kalman filter 604 may also be accomplished via this interface. Here it is assumed that the wireless transmitter 606 sends process measurement signals intermittently, non-periodically and/or at a rate that is slower than the execution rate of the Kalman filter 604. The transmitter 606 could, for example, send a process measurement signal only at times that the process measurement signal changes a preset amount from the last sent process measurement signal, or could send a process measurement signal at a periodic rate that is less than the execution rate of the Kalman filter 604 or the controller 601, or according to any other intermittent rate or schedule, for example. Generally speaking, in this case, the Kalman filter 604 and the PID controller 601 execute on a periodic basis at a faster or a much faster rate than the rate at which the measurement update is received by the Kalman filter 604 from the transmitter 606. To accommodate this situation, the modified Kalman filter 604 includes a switch unit 662 that receives a residual signal produced from the summer 418 and provides that signal to a Kalman gain block 622. In particular, during the execution cycle at which a new value of the process measurement output signal is available at the interface 660, and during a predetermined number of execution cycles after the execution cycle at which a new value of the process measurement output signal is available, the switch unit 662 operates to provide a new value of the residual to the Kalman gain block 622. The new value of the residual is determined in the combiner 418 based on the a priori process state variable estimate $\hat{X}_j^-$ and a received value of the process measurement output signal at the interface 660. As such, during the execution cycle at which a new value of the process measurement output signal is available, the received value of the process measurement output signal corresponds to the newly received value of the process measurement output signal. On the other hand, during execution cycles after the predetermined number of execution cycles after the execution cycle at which a new value of the process measurement output signal is available at the interface 660, the switch unit 662 operates to provide a stored value of the residual to the Kalman gain block 622. Generally speaking, the stored value of the residual may be determined in the combiner 418 during the last execution cycle of the predetermined number of execution cycles, and stored in the switch unit 662. The purpose of using the predetermined number of execution cycles is to allow the process state variable $\hat{X}_j^-$ to be fully updated with respect to the newly received process measurement output signal to thereby determine a more accurate value of the stored residual. Thus, during execution cycles after the predetermined number of execution cycles at which a new value of the process measurement output signal is available, the Kalman filter 604 uses the stored value of the residual in the switch unit 662 to produce the correction signal used to produce the process variable estimate $\hat{X}_j$ to be sent to the controller 601.

Still further, during the execution cycle at which a new process measurement output value $Z_j$ is transmitted to, received at or otherwise available at the interface 660, and during the predetermined number of execution cycles after the execution cycle at which a new process measurement output value $Z_j$ is available, the Kalman gain block 622 is configured to calculate a new value for the Kalman gain $K_j$ for use in the Kalman gain block 622. However, during the execution cycles after the predetermined number of execution cycles after the execution cycle at which a new process measurement output value $Z_j$ is available, the Kalman gain block 622 is configured to use a stored value of the Kalman gain $K_j$, where the stored value of the Kalman gain $K_j$ is calculated during the last execution cycle of the predetermined number of execution cycles. In addition, because the covariance values R used in the calculation of the Kalman gain values are only calculated using measurement values that have been transmitted, the PID control algorithm 630 of the controller 601 still works using a newly predicted value of the process variable measurement.

More particularly, during operation, the interface 660 operates to store a newly received value of the sensed or measured process output signal 4, as sensed and sent by the transmitter 606. The interface 660 provides the value of this newly received and stored process output signal $Z_j$ to the input of the summer or combiner 418 for use in producing the residual on the line 440. Subsequently, the switch unit 662 operates to provide the residual to the gain block 622. At the same time, the interface 660 sets a new value flag whenever the interface 660 receives a new value from the transmitter 606, and provides this new value flag to both the switch unit 662 and the gain block 622. When the new value flag is set, the switch unit 662 clears any previously stored residual value. The switch unit 662 then operates to provide a newly determined value of the residual, as determined, for example, by the summer 418 when a new process output signal $Z_j$ is received at the interface 660, to the Kalman gain block 622. The switch unit 662 continues to provide a new value of the residual to the Kalman gain block 622 during the predetermined number of execution cycles. On the last execution cycle of the predetermined number of execution cycles, the switch unit 662 proceeds to store the residual calculated during this last execution cycle. Thus, during the execution cycles after the predetermined number of execution cycles, the switch unit 662 operates to provide the Kalman gain block 622 with the stored residual value. Likewise, when the new value flag is set, the Kalman gain block 622 clears any previously stored Kalman gain value. Thus, during the execution cycle at which a new value of the process output signal $Z_j$ has been received at the interface 660 and for the predetermined number of execution cycles thereafter, the Kalman gain block 622 proceeds to calculate a new Kalman gain $K_j$ for use in the gain block 622. The Kalman gain block 622 continues to calculate a new Kalman gain value for use in the gain block 622 during the predetermined number of execution cycles. However, on the last execution cycle of the predetermined number of execution cycles, the Kalman gain block 622 proceeds to store the Kalman gain $K_j$ calculated during this last execution cycle. Accordingly, during the execution cycles after the predetermined number of execution cycles, the Kalman gain block 622 operates to use the stored Kalman gain $K_j$. Consequently, the switch unit 662 and the Kalman gain block 622 operate during each execution cycle of the Kalman filter 604 to generate an estimate of the noise, which is then provided to the summer 414 and used to produce the estimated process state variable value $\hat{X}_j$. In this manner, the Kalman filter 604 provides accurate process variable estimates during or between the times at which new process variable measurements are received at the Kalman filter 604. If desired, the predetermined number of execution cycles is at least one and maybe more, such as two, three, etc. As will be understood, the purpose of storing and using a residual that has been calculated after or at the end of one or more predetermined execution cycles after the receipt of a new process variable measurement value is allow the stored residual to be more accurate because it will based on a difference between the most recently received process variable measurement and an estimate of that measurement made using the most recently received process variable itself instead of an estimate based on a previously received process variable measurement. In particular, it will take one or more execution cycles of the Kalman filter for the process state variable to be calculated via the feedback path 423 using a process variable estimate calculated from a residual determined using the new process variable measurement.

Figure 7:
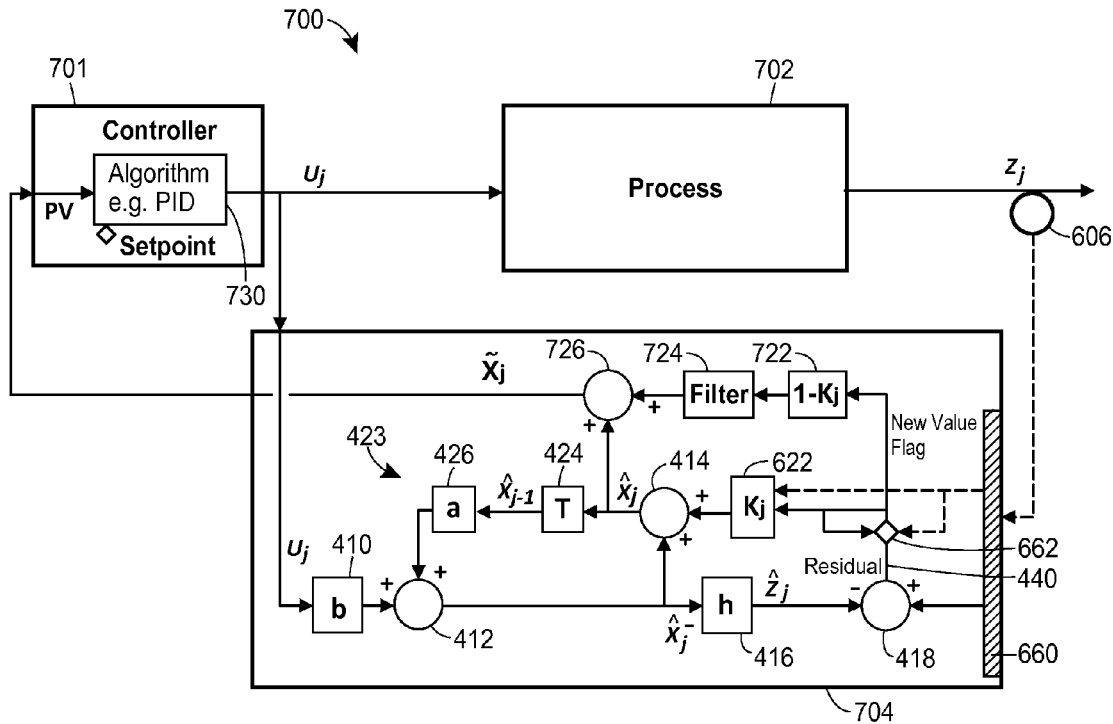
FIG. 7 is a schematic representation of a controller and a Kalman filter, used to control a process, wherein the Kalman filter is configured to receive non-periodic, intermittent or slow measurements of a process variable via a wireless communication link and to compensate for non-zero mean value noise in the process.

If the process noise having a non-zero mean value is present in the process 602, then the process model within the Kalman filter 604 needs to be modified in order to account for this noise. In particular, FIG. 7 illustrates a process control system 700 that includes a controller 701 (which may be similar to or identical to the controllers 601, 501, 401, 301 and 201 and has a controller algorithm 730) coupled to a process 702, which includes process noise with non-zero mean value. The control system 700 includes a Kalman filter 704 modified as described above with respect to FIG. 6 to receive wireless process variable measurements that are provided in a non-periodic, intermittent or slow manner. As will be seen, the Kalman filter 704 is the same as the Kalman filter 604 of FIG. 6 (and like elements are numbered the same), except that the Kalman filter 704 includes a gain block 722, a filter block 724, and a summer 726, which are similar to and operate for the same purposes as the gain block 522, the filter block 524, and the summer 526 of FIG. 5. Thus, in this case, the Kalman filter 704 calculates a compensated process state variable estimate $\tilde{X}_j$ that does not include any offset caused by the process noise with non-zero mean value. Of course, in this case, the filter 722 uses the same residual as used by the filter 622, i.e., either a newly calculated residual (during the execution cycle at which a new process measurement value is received and the predetermined number of execution cycles thereafter), or a stored residual (during the execution cycles after the predetermined number of execution cycles after which a new process variable measurement value has been received).

As will be understood, the modified Kalman filters 604 and 704 of FIGS. 6 and 7 enable the use of intermittently, non-periodically or slowly provided process variable measurement values provided from a process via, for example, a wireless transmission network. As a result, the Kalman filters 604 and 704 enable Kalman filter based control in process situations in which process variable values are measured or are sent to the control system in a non-periodic or intermittent manner, or at a rate that is slower or less than the execution rate of the Kalman filter and the controller.

When using a Kalman filter, such as those of FIGS. 6 and 7, it is desirable or sometimes necessary to configure the model parameters, such as the parameters a, b and h described above. For example, in a self-regulating process, the model parameters may be set based on knowledge of the process gain, the process time constant and the process dead time. For an integrating process, the model parameters may be set based on knowledge of process integrating gain and the process dead time. To minimize the need for the user to set these parameters, the model used in the Kalman filter could be automatically configured based on the controller tuning parameter and some assumptions about the tuning. For example, if the control algorithm is a PID algorithm, then the Kalman filter model parameters could be set based on the PID controller gain, reset and rate.

When the Kalman filter is used in wireless control, then the calculations associated with the Kalman gain may be simplified if the noise level is constant or insignificant. For example, if the noise covariance R, associated with measurement noise is assumed to be zero (0), then the Kalman gain is a constant and may be calculated or determined as:

$$K_j = \frac{1}{h}, \text{assuming } R = 0.$$

Figure 8:
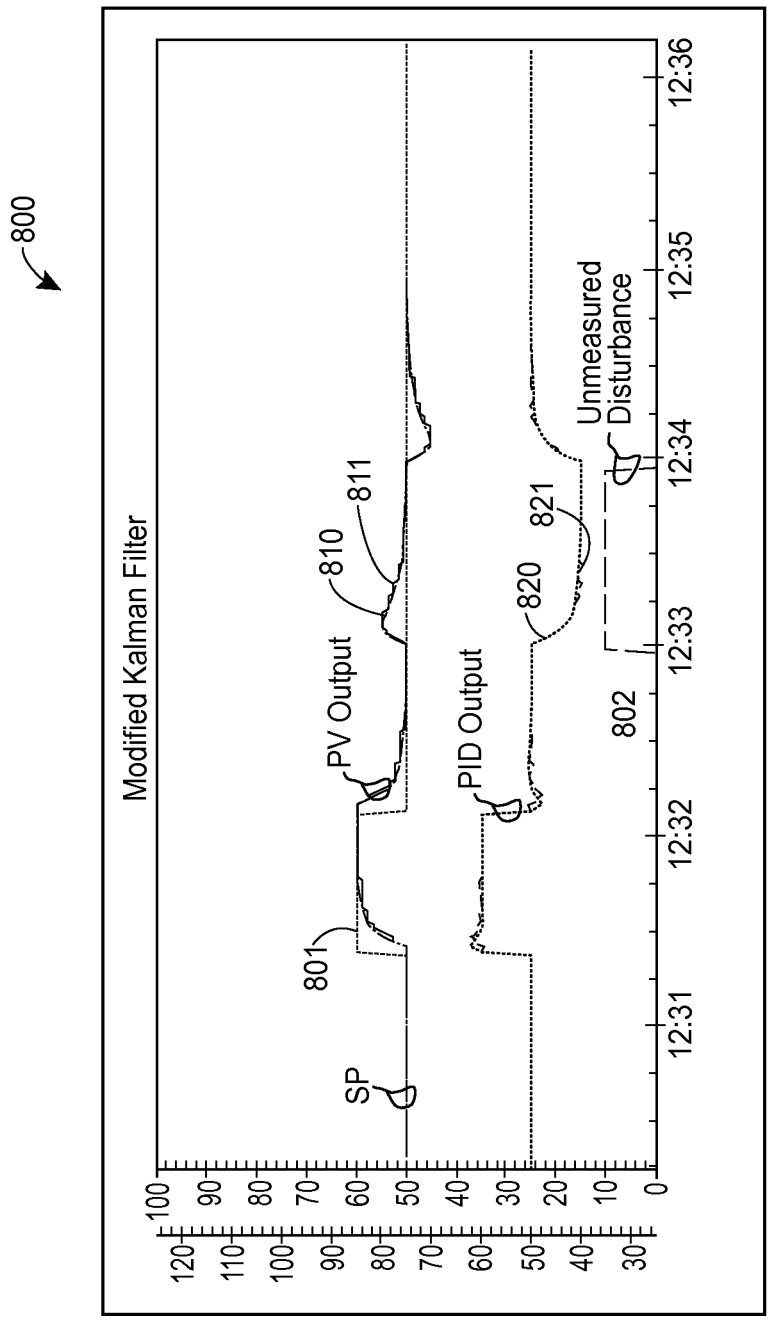
FIG. 8 is a graph illustrating the modeled operation of a control system having a PID controller with a modified Kalman filter that receives non-periodic, slow or intermittent process variable measurements via a wireless communication link and compensates for non-zero mean value noise in the control system versus a control system having a PID controller that periodically receives process measurements via a wired communication link.

FIG. 8 is provided to illustrate the performance of a control system using the modified Kalman filter described above which received intermittent process variable measurements, as compared to traditional PID based control systems that receive wired or periodic measurements. In particular, FIG. 8 depicts a chart 800 illustrating a computer simulated operation of a control system such as that of FIG. 7 having a PID controller and a modified Kalman filter operating as described with respect to FIGS. 6 and 7 (in which process variable measurements are provided to the input of the Kalman filter at a rate less than the execution rate of the control system) as compared to PID control, in which periodic process variable measurements are provided to the input of the PID controller at a rate greater than or equal to the execution rate of the control system. In FIG. 8, the line 801 indicates the setpoint value provided to the controller while the line 802 indicates the value of an unmeasured disturbance in the process being controlled. As will be seen, each of these variables are changed at different times to illustrate the response of and operation of both types of control systems to each of these two types of changes during process operation.

The lines 810 and 811 of FIG. 8 illustrate the simulated value of the process variable being controlled (PV) by the typical control system (PID controller with periodic measurement feedback) and the modified control system (PID controller with modified Kalman filter that receives non-periodic, e.g., wireless, measurement feedback and compensates for non-zero mean value noise), respectively. Likewise, the lines 820 and 821 illustrate the simulated value of the control signal output by the PID controller by the typical control system (PID controller with periodic measurement feedback) and the control signal output by the PID controller of the modified control system (PID controller with modified Kalman filter that receives non-periodic, e.g., wireless, measurement feedback and compensates for non-zero mean value noise), respectively. These lines demonstrate how a modified Kalman filter may be used with a PID controller to provide closed loop control using a wireless measurement as compared to a PID controller with a wired transmitter.

In this simulated test, the process used for comparison was a first order plus dead time process with the following characteristics:

Process Gain=1
Process Time Constant=6 sec
Process Dead Time=2 sec

The PID controller in all cases was tuned for a lambda factor of 1.

GAIN=1/Process Gain
RESET=Process Time Constant+Process Dead Time

The process input and output were scaled to 0-100% to make comparisons easier to graph. Thus, the value of h (the unit conversion factor) was equal to one (1) in these examples. For the modified Kalman filter, the noise level was minimal and thus the Kalman filter gain was set to a constant value of 1/h=1. The simulated wireless transmitter was configured for 1 percent change and 10 second default period using windowed communications. The module (controller) execution rate was set at 0.5 seconds.

As will be seen from a close inspection of the lines 810 and 811 and the lines 820 and 821, the modified control system using a Kalman filter operated very similarly to a PID control system in which periodic process variable measurements are provided to the controller at a rate greater than or equal to the execution rate of the control system. In fact, as illustrated in the chart of FIG. 8, the control performance was comparable to a PID controller and a wired measurement for both setpoint changes and for large unmeasured process disturbances. As part of the test module, the integrated absolute error (IAE) of control with wireless and the IAE for control with a wired measurement were calculated as 361 and 336 respectively, thus evidencing nearly identical or very comparable control performance on this measure.

Figure 9:
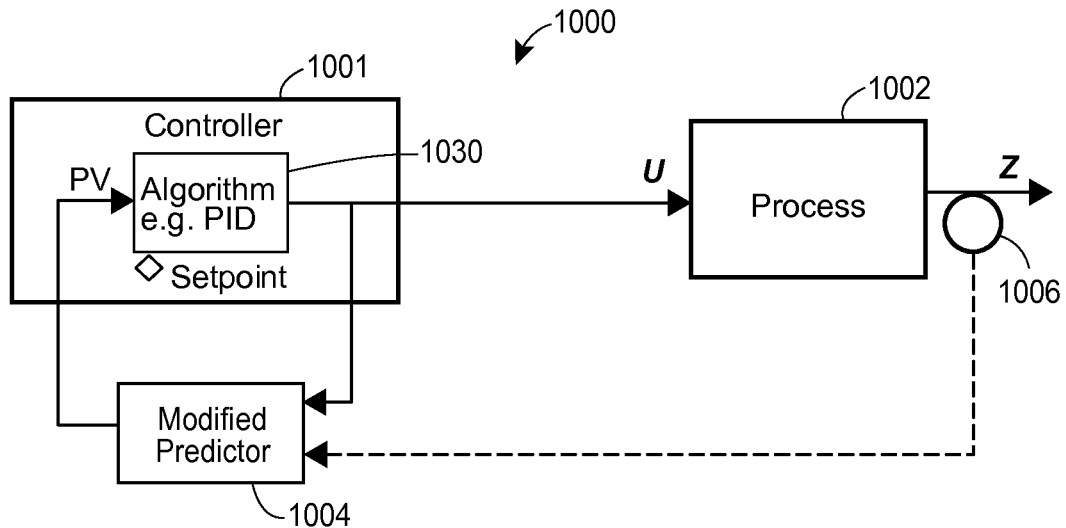
FIG. 9 is a schematic illustration of a process control system having a controller block separate from a modified predictor block.

FIG. 9 illustrates one manner of implementing a modified predictor and a controller within a control system 1000, such as the control system of FIG. 1. As illustrated in FIG. 9, a controller 1001 is connected to control a process 1002 and a modified predictor 1004 is communicatively coupled between the controller 1001 and a wireless transmitter 1006, which measures one or more process variables within the process 1002. The modified predictor 1004 may be any of the modified predictors described above, or a modified predictor constructed based on the techniques disclosed herein. As illustrated in FIG. 9, the modified predictor 1004 is configured as, and is operated or executed as a separate and stand-alone block, such as a separate function block or a separate control module associated with the control system 1000. For example, where the controller 1001 is implemented as a function block or control module, then the modified predictor 1004 could be implemented as a separate function block or a separate control module that is communicatively coupled to the controller function block or module as illustrated in FIG. 9. In this case, a control block 1030 of the controller 1001 may be stored and executed within a separate device from the predictor 1004 (in which case device to device communications occur for the communications between the predictor 1004 and the control block 1030 of the controller 1001) or may be stored and executed within the same device as the predictor 1004 (in which case intra-device communications may occur for the communications between the predictor 1004 and the control block 1030 of the controller 1001). In either case, these two blocks are communicatively coupled to one another via a communication line, path or network.

In this example, the modified predictor block 1004 can be communicatively connected to the control block 1030 in a manner such that the block 1004 provides an updated process variable estimate to the controller block 1030 at least once per execution cycle of the controller 1001. In any case, the modified predictor block 1004 could be located in various different ones of the controller, the field devices, the I/O devices, etc. of FIG. 1 while the controller 1001 can be located in the same or other such devices.

Figure 10:
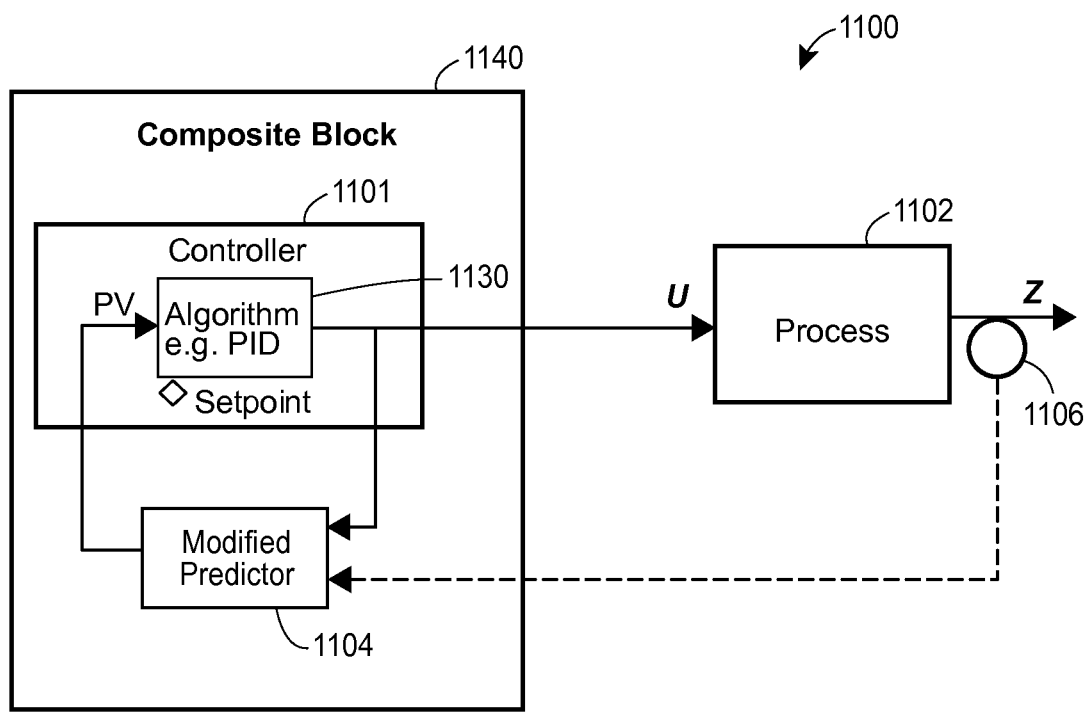
FIG. 10 is a schematic illustration of a process control system having a modified predictor block disposed in the same control module as a controller block.

FIG. 10 depicts a process control system 1100 in which a controller block 1101 is used to control a process 1102 and a modified predictor block 1104 receives wireless transmission signals from a wireless transmitter 1106. Here, however, the modified predictor block 1104 is located in the same composite block, but in a separate module, as the controller algorithm block 1130. Thus, in this example, the controller algorithm block 1130 and the modified predictor 1104 are integrated together in the same composite module (indicated as a composite block 1140) and thus execute in the same device in the process control network, such as the process control network 10 of FIG. 1. Typically, this module would be executed in one of the controllers 11, but could be any of the other devices of FIG. 1, including wired or wireless field devices, I/O devices, etc. In this case, the user interface provided for the controller block 1101 may show the predicted measurement value produced by the predictor 1104 as the process variable PV measurement input into the controller block 1101. In most cases, however, the plant operator would be more interested in viewing the last communicated measurement value when accessing or viewing the control operation. To allow the measurement value to be shown to the operator as the control parameter, a controller block that contains the controller and modified predictor blocks could be created as illustrated in, for example, FIG. 11.

Figure 11:
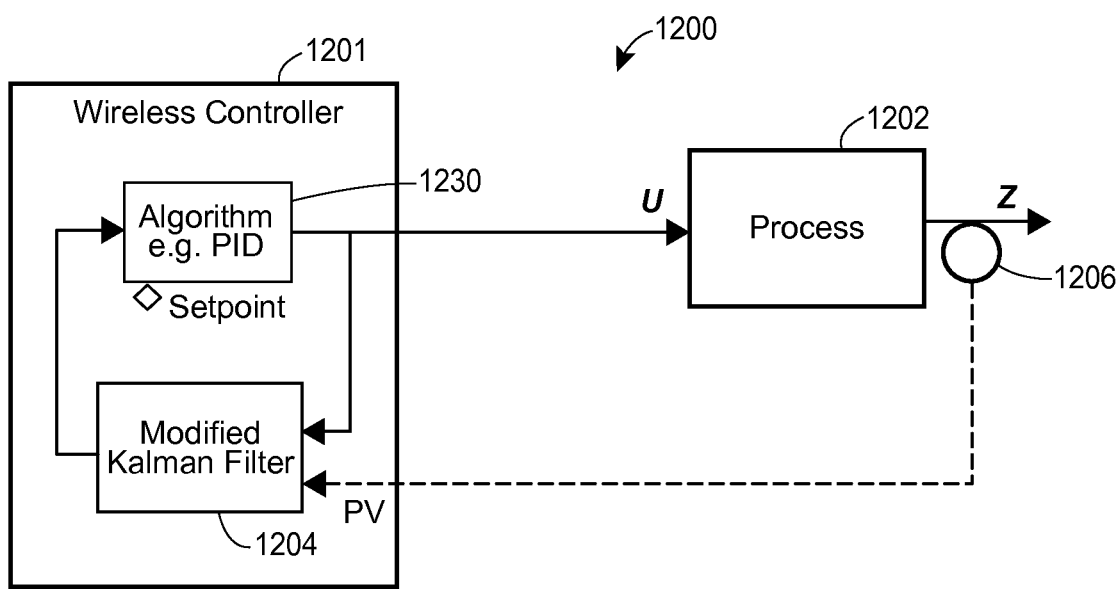
FIG. 11 is a schematic illustration of a process control system having a modified Kalman filter integrated with a control algorithm block in a controller.

In particular, FIG. 11 illustrates an example of a control block 1201 in which a predictor block 1204 (indicated in FIG. 11 to be a modified Kalman filter) is integrated into the same block as a controller algorithm block 1230. Thus, in this case, the control block or module 1201 includes both the controller algorithm function block 1230 and the modified Kalman filter block 1204. In this case, the modified Kalman filter block 1204 is treated as part of the control module 1201 itself and is thus viewable (and has parameters thereof accessible) as part of the control block 1201. Thus, in this situation, the process measurement output Z would appear to the operator to be the feedback process variable (PV) input to the controller 1201.

While the discussion provided herein has presumed that, for each of the different described embodiments, the controller coupled to the modified predictor implements a PID control routine, this description is provided for the sake of consistency only. It will be understood that other types of control algorithms besides traditional PID control algorithms (which include any form of PID, such as P, PI, PD, PID, etc.) may be used as the controller in a control scheme using a modified predictor as described herein. Of course there are many other ways of implementing the modified predictors described herein, and as will be understood, the modified predictors may be used together with (e.g., in the same module or device) or separately from (e.g., in different modules or devices) as the controllers or the control blocks or control elements to which the modified predictors are connected. Likewise, the controllers and the modified predictors described herein may be implemented in hardware, in software routines executed on a general purpose computer, or in software or firmware routines executed on a specific purpose computer or processor device.

In any of the disclosed embodiments, the modified predictors or the devices in which the modified predictors may include a communications stack to process the incoming process variable measurement signals, and a module or routine to detect when an incoming signal has provided a measurement update. The detection routine may then generate a flag or other signal to denote that data being provided via the communications stack includes a new measurement or other type of value or update. The new data and the update flag may then be provided to one or more elements of the predictors as described above to be implemented as discussed above in connection with the operation of the observer and control routines. Alternatively, or in addition, the new data and the update flag may be provided to one or more monitoring modules or applications executed in, for example, the controller 11 of FIG. 1 or elsewhere in the control system. The update detection functionality may be implemented at the function block level as well, and may be provided by one or more function blocks associated with a control and/or observer module. Other wireless devices, such as the field device 71, may include similar components and functionality to support the reception and processing of such signals by, for instance, one or more of the function blocks (e.g., FB1 and FB2) resident therein.

In some cases, the communications stack and the update detection modules may be implemented by one or more of the I/O devices 26, 28, 73 and 74 of FIG. 1. Furthermore, the manner in which the update detection module makes its determination may involve hardware, software, firmware or any combination thereof, and may involve any suitable routine for comparing values of the process variable.

The process control systems described herein may be utilized in connection with communication schemes, such as wireless communications, involving process control data transmissions made on a report-by-exception basis. Exception reporting of the process control data in a wireless communication context may present a number of advantages. For example, the rate at which power is consumed in the field by the transmitters or other field devices may be lowered, thereby conserving battery power or other limited power supplies. Unlike past exception reporting, however, the disclosed techniques support the transmission of data utilized in a process control routine executed on a periodic basis. Despite the admonitions of the past discouraging the execution of process control routines utilizing data provided on an event-triggered basis, practice of the disclosed techniques accommodates the periodic execution of process control routines without detrimental sacrifices in performance. The disclosed techniques further support providing data to system monitoring applications on an event-triggered basis, similarly without detrimental sacrifices in performance Although well suited for, and described at times herein in connection with, wireless communication schemes, practice of the disclosed techniques is not limited to any particular communication scheme, context, or protocol, or any process control network, architecture, controller or system, or any monitoring application. Instead, the disclosed techniques may be applied in any number or variety of contexts in which process control data is transmitted less frequently than the control routine execution period, or monitoring cycle, and for any desired reason. Such contexts may present undesirable or adverse conditions making communications unreliable or intermittent. Accordingly, the foregoing description is set forth with the understanding that practice of the disclosed techniques is not limited to the low-power or other wireless communication schemes described in particular herein.

As will be understood, the communication techniques described above for the wireless (or other) transmitters of FIGS. 1, 3, 6, 7 and 9-11 generally result in non-periodic, irregular or otherwise less frequent data transmissions when the communication of measurement values from the field to the controller 11 has traditionally been structured to report in a periodic manner to, in turn, support the periodic execution of the control routine(s). In other words, the control routines are generally designed for, and rely on, periodic updates of the measurement values. To accommodate the non-periodic or otherwise unavailable measurement updates (and other unavailable communication transmissions), the predictor, control and monitoring routine(s) may be restructured or modified as described above to enable the process control system 10 to rely on non-periodic or other intermittent updates that occur less frequently than the control execution period or some other standard period. In this manner, the disclosed techniques may, in some cases, generally support a form of exception reporting for the process variable measurements despite the periodic execution of the process control routines. The disclosed techniques may also address and support a form of exception reporting involving transmissions between the control routine and the devices downstream of the control routine, e.g., the actuators and other devices or elements responsive to the control signal generated by the control routine.

Of course, it will be understood that, in some cases, devices may collect and monitor multiple different measurements (i.e., measurements of different signals) and that the same transmission techniques described herein could be used for each of these one or more measurements. Still further, in some cases, the devices collecting the measurements can perform an advanced analysis (such as an error detection analysis, tuning analysis, etc.) or measurement on the data and the same communication techniques described herein could be applied to determine whether or not to send a full analysis, a single status, or wait until the next sample interval to transmit a signal.

In accordance with some aspects of the disclosure, the techniques described herein may be applied in contexts in which a number of different wireless (or other) communications between the controller and the field device(s) or other elements of the process control system are undesirably delayed or lost. Accordingly, the foregoing examples regarding communication problems between the controller and a transmitter, and between a controller and an actuator, have been set forth with the understanding that they are exemplary in nature. Furthermore, the parameters involved in the communications are not limited to process variables being controlled by the control routine. To the contrary, the disclosed techniques may be applied in connection with communications involving any parameter being measured or fed back or otherwise communicated for use by the control routine or a monitoring routine. As a result, the response indications described above (i.e., a process variable measurement and an actuator position) are set forth with the understanding that they are exemplary in nature. Communication problems involving other data indicative of a response to the control signal may also be addressed by the disclosed techniques. As a result, any communication of data from an element (e.g., field device, another process control routine, etc.) downstream of the control routine may be involved.

Practice of the disclosed methods, system and techniques is not limited to any one particular wireless architecture or communication protocol. In fact, the disclosed modifications to the control routines are well-suited for any context in which the control routine is implemented in a periodic manner, but without process variable measurement updates for each control iteration. Other exemplary contexts include where a sampled value is provided irregularly or more seldom by, for instance, an analyzer or via lab samples.

Moreover, practice of the disclosed technique is not limited to use with single-input, single-output PI or PID control routines, but rather may be applied in a number of different multiple-input and/or multiple-output control schemes and cascaded control schemes that use predictors. More generally, the disclosed technique may also be applied in the context of any closed-loop model-based control routine involving one or more process variables, one or process inputs or other control signals, such as model predictive control (MPC).

The term "field device" is used herein in a broad sense to include a number of devices or combinations of devices (i.e., devices providing multiple functions, such as a transmitter/actuator hybrid), as well as any other device(s) that perform(s) a function in a control system. In any event, field devices may include, for example, input devices (e.g., devices such as sensors and instruments that provide status, measurement or other signals that are indicative of process control parameters such as, for example, temperature, pressure, flow rate, etc.), as well as control operators or actuators that perform actions in response to commands received from controllers and/or other field devices.

When implemented, any of the units, blocks, modules, switches, combiners, adders, gain blocks, etc. described herein may executed as software or firmware that is stored in any computer readable memory such as on a magnetic disk, a laser disk, or other storage medium, in a RAM or ROM of a computer or processor, etc. Thus, the specific hardware like embodiments described herein can be implemented in software on a computer processor using the techniques described herein. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc.

While the present invention has been described with reference to specific examples, which are intended to be illustrative only and not to be limiting of the invention, it may be apparent to those of ordinary skill in the art that changes, additions or deletions may be made to the disclosed embodiments without departing from the spirit and scope of the invention.

The invention claimed is:

1. A control system for use in controlling a process, the control system comprising:
a control unit including a process variable input and a control routine unit communicatively coupled to the process variable input, wherein the control routine unit generates a control signal for use in controlling the process based on a process variable value received at the process variable input;
a Kalman filter unit coupled to the control unit, the Kalman filter unit operating once during each of a number of execution cycles to produce a process variable estimate, the Kalman filter unit including;
a control signal input coupled to receive the control signal produced by the control routine unit,
an interface including a process variable feedback input that receives a process variable measurement signal less frequently than once per the execution cycle time of the Kalman filter unit,
a process model coupled to receive the control signal at the control signal input to produce an initial process variable estimate,
a correction unit coupled to use the process variable measurement signal received via the process variable feedback input to produce a correction signal from a residual, wherein the correction unit includes a first combiner, a switch unit and a gain unit, and
a second combiner coupled to the process model and to the correction unit to combine the initial process variable estimate with the correction signal to produce a further process variable estimate;
wherein during the execution cycle of the Kalman filter unit at which a new value of the process variable measurement signal is available and during a predetermined number of execution cycles after the execution cycle at which a new value of the process variable measurement signal is available, the switch unit operates to provide a new value of the residual to the gain unit to produce the correction signal, wherein the new value of the residual is determined by combining the initial process variable estimate with a value of the process variable measurement signal at the first combiner;
wherein during execution cycles of the Kalman filter unit after the predetermined number of execution cycles after the execution cycle at which a new value of the process variable measurement signal is available, the switch unit operates to provide a stored value of the residual to the gain unit to produce the correction signal, wherein the stored value of the residual is determined during the one of the execution cycles of the predetermined number of execution cycles; and
wherein the process variable input of the control unit is coupled to receive the process variable estimate based on the further process variable estimate.

2. The control system of claim 1, wherein the process variable estimate is the further process variable estimate.

3. The control system of claim 1, wherein the gain unit multiplies a value of the residual by a gain value to produce the correction signal;
wherein during the execution cycle of the Kalman filter unit at which a new value of the process variable measurement signal is available and during the predetermined number of execution cycles after the execution cycle at which a new value of the process variable measurement is available, the gain unit operates to determine a new gain value for use in the gain unit; and
wherein during the execution cycles of the Kalman filter unit after the predetermined number of execution cycles after the execution cycle at which a new value of the process variable measurement signal is available, the gain unit operates to use a stored gain value, wherein the stored gain value is determined during one of the execution cycles of the predetermined number of executions cycles.

4. The control system of claim 3, wherein the gain unit is a Kalman gain unit that determines a Kalman gain value for use in the gain unit.

5. The control system of claim 1, wherein the Kalman filter unit further includes;
a compensation unit coupled to use the residual to produce a compensation signal, wherein the compensation unit includes a further gain unit that multiples a value of the residual by a further gain value and a filter unit that receives the value of the residual multiplied by the further gain value to produce the compensation signal, and
a third combiner coupled to the second combiner and to the compensation unit to combine the further process variable estimate with the compensation signal to produce the process variable estimate.

6. The control system of claim 5, wherein the further gain unit is a Kalman gain unit that determines a value of one minus a Kalman gain value for use in the further gain unit.

7. The control system of claim 5, wherein the filter unit is a first order filter.

8. The control system of claim 1, wherein the control routine unit stores and implements a proportional-integral-derivative control algorithm to produce the control signal.

9. A method of controlling a process, comprising:
implementing, on a computer processor device, a control routine during each of a number of execution cycles to produce a control signal for use in controlling the process;
receiving, at a computer processor device, a process variable measurement signal less frequently than the execution cycle time;
implementing, on a computer processor device, a Kalman filter routine during each of the number of execution cycles to produce the process variable estimate, including;
receiving the control signal produced by the control routine during each of the number of execution cycles,
producing an initial process variable estimate using a process model to model the reaction of the process based on the control signal during each of the number of execution cycles,
producing a correction signal from a residual during each of the number of execution cycles,
combining, during each of the number of execution cycles, the initial process variable estimate with the correction signal to produce a further process variable estimate, and
producing a process variable estimate based on the further process variable estimate,
wherein during the execution cycle at which a newly received value of the process variable measurement signal is available and during a predetermined number of execution cycles after the execution cycle at which a newly received value of the process variable measurement is available, producing the correction signal from the residual includes using a new value of the residual, wherein the new value of the residual is determined by combining the initial process variable estimate with a received value of the process variable measurement signal, and
wherein during execution cycles after the predetermined number of execution cycles after the execution cycle at which a newly received value of the process variable measurement signal is available, producing the correction signal from the residual includes using a stored value of the residual, wherein the stored value of the residual is determined during one of the execution cycles of the predetermined number of execution cycles.

10. The method of claim 9, wherein the process variable estimate is the further process variable estimate.

11. The method of claim 9, wherein producing the correction signal from the residual includes determining a gain value and multiplying a value of the residual by the gain value to produce the correction signal during each of the number of execution cycles, and determining a new gain value for use during the execution cycle at which a new value of the process variable measurement signal is available and during the predetermined number of execution cycles after the execution cycle at which a new value of the process variable measurement signal is available, and using a stored gain value during the execution cycles after the predetermined number of execution cycles after the execution cycle at which a new value of the process variable measurement signal is available.

12. The method of claim 11, wherein determining the gain value includes determining a Kalman gain value.

13. The method of claim 9, wherein implementing the Kalman filter routine further includes,
determining a compensation signal during each of the number of execution cycles, and
producing, during each of the number of execution cycles, the process variable estimate by combining the further process variable estimate with the compensation signal.

14. The method of claim 13, wherein determining the compensation signal includes determining a further gain value and multiplying a value of the residual by the further gain value and filtering the value of the residual multiplied by the further gain value to produce the compensation signal during each of the number of execution cycles.

15. The method of claim 14, wherein determining the further gain value includes determining a value of one minus a Kalman gain value.

16. The method of claim 14, wherein filtering the value of the residual multiplied by the further gain value includes using a first order filtering.

* * * * *